(12) United States Patent
Ozawa

(10) Patent No.: US 6,603,718 B1
(45) Date of Patent: Aug. 5, 2003

(54) DUBBING APPARATUS AND DUBBING METHOD

(75) Inventor: Hiroyuki Ozawa, Tokyo (JP)

(73) Assignee: Sony Corporation, Tokyo (JP)

( * ) Notice: Subject to any disclaimer, the term of this patent is extended or adjusted under 35 U.S.C. 154(b) by 294 days.

(21) Appl. No.: 09/712,892

(22) Filed: Nov. 15, 2000

(30) Foreign Application Priority Data

Nov. 30, 1999 (JP) .......................................... 11-340985

(51) Int. Cl.[7] .......................... G11B 20/10; G11B 19/02
(52) U.S. Cl. .................. 369/47.1; 369/47.3; 369/53.24; 369/84
(58) Field of Search .............................. 369/47.3, 53.37, 369/84, 30.05, 30.19, 53.24, 47.12, 47.28, 471

(56) References Cited

U.S. PATENT DOCUMENTS

| | | | | |
|---|---|---|---|---|
| 5,485,447 A | * | 1/1996 | Minoda ................... | 369/47.12 |
| 5,521,894 A | * | 5/1996 | Hiranuma ................. | 369/47.11 |
| 5,610,893 A | * | 3/1997 | Soga et al. .............. | 369/53.24 |
| 5,625,610 A | * | 4/1997 | Hiranuma ................. | 369/47.12 |
| 5,751,678 A | * | 5/1998 | Tanaka .................... | 369/53.24 |
| 5,943,311 A | * | 8/1999 | Takenaka ................. | 369/47.12 |
| 6,088,312 A | * | 7/2000 | Utsumi .................... | 369/47.11 |
| 6,137,642 A | * | 10/2000 | Inoue ..................... | 369/53.24 |
| 6,272,088 B1 | * | 8/2001 | Aramaki et al. ......... | 369/53.24 |
| 6,298,022 B1 | * | 10/2001 | Aramaki et al. ......... | 369/47.11 |
| 6,310,842 B1 | * | 10/2001 | Higuchi ................... | 369/47.15 |
| 6,388,959 B1 | * | 5/2002 | Kondo .................... | 369/30.19 |
| 6,396,998 B1 | * | 5/2002 | Nozaki et al. | |

* cited by examiner

*Primary Examiner*—Richemond Dorvil
*Assistant Examiner*—Jorge L. Ortiz-Criado
(74) *Attorney, Agent, or Firm*—Oblon, Spivak, McClelland, Maier & Neustadt, P.C.

(57) ABSTRACT

Disclosed is a dubbing apparatus for selectively permitting dubbing of programs at standard or higher speed and inhibiting for a predetermined period of time consecutive higher-speed dubbing of programs that have been recorded each in its entirety at higher speed. A program not accommodated entirely by a destination storage medium is allowed to be dubbed consecutively at higher speed.

12 Claims, 20 Drawing Sheets

SEAMLESS RECORDING MODE

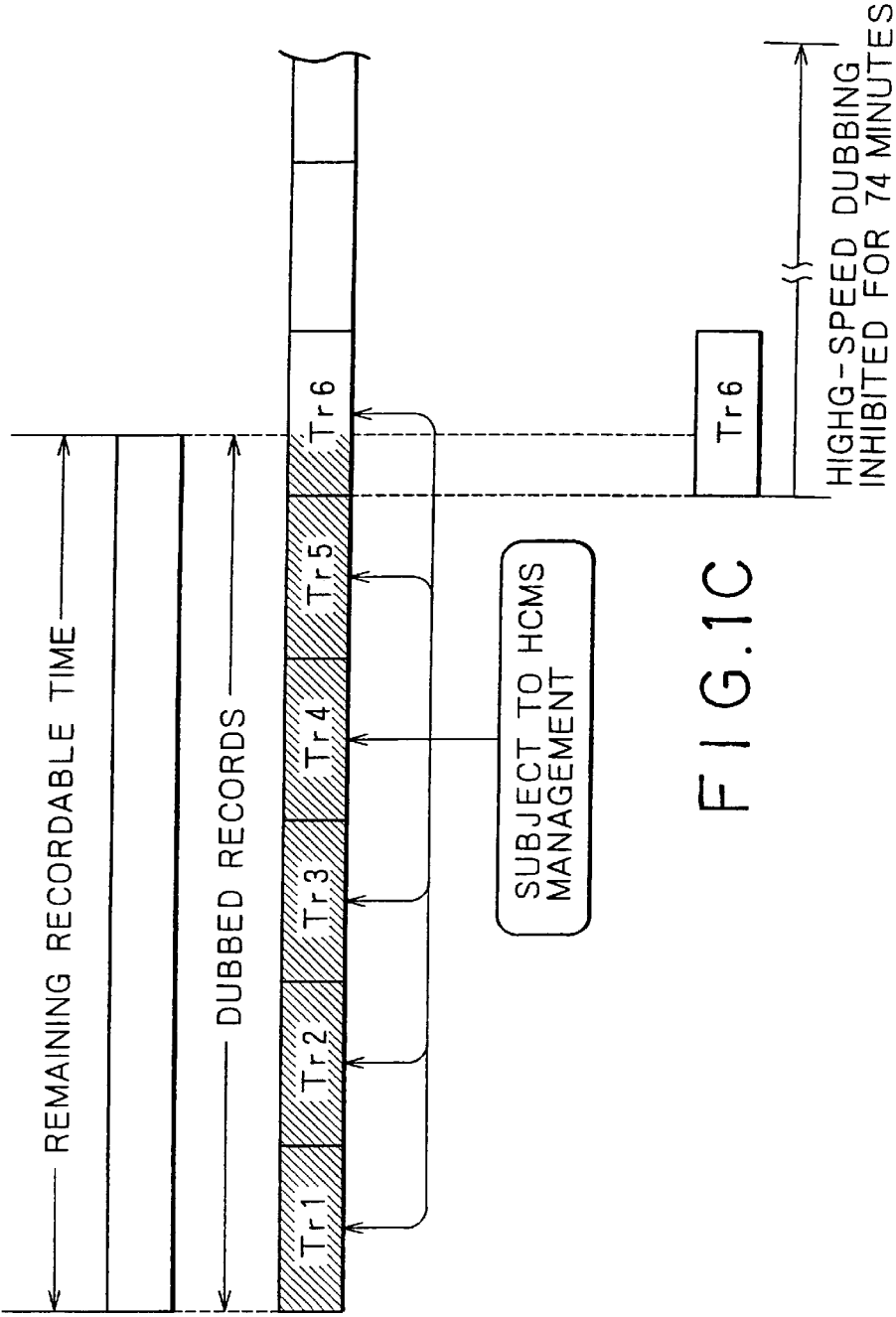

BACKGROUND ART
FIG. 2A CD 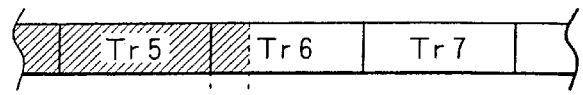
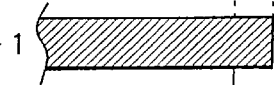
FIG. 2B MD-1
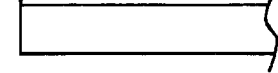
FIG. 2C MD-2
BACKGROUND ART
FIG. 3A CD 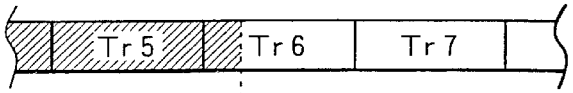
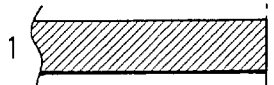
FIG. 3B MD-1
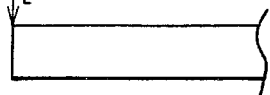
FIG. 3C MD-2

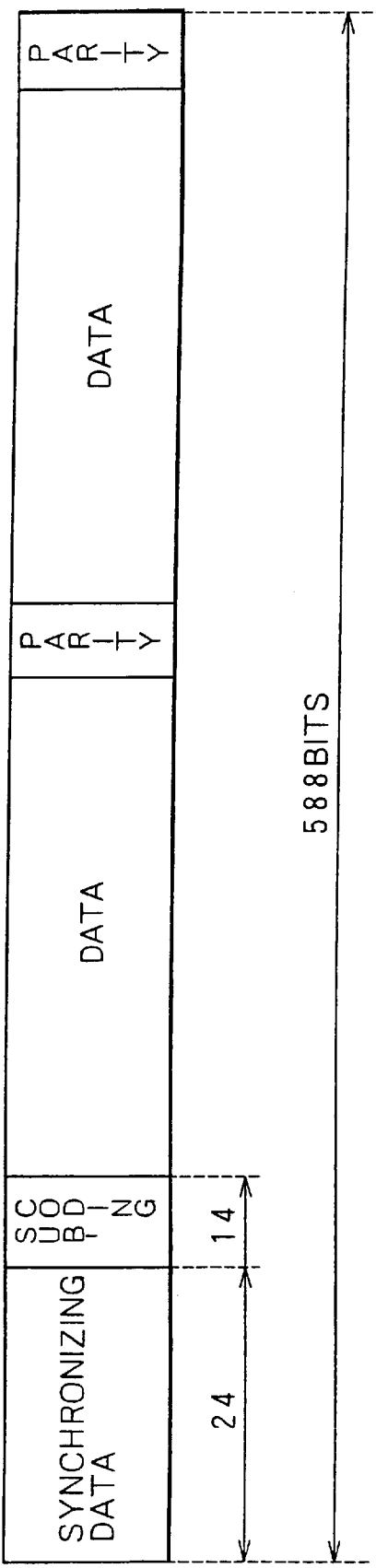

FIG. 5

| FRAME | SUB-CODING |
|---|---|
| 98n+1 | SYNCHRONIZING PATTERN (S0) |
| 98n+2 | SYNCHRONIZING PATTERN (S1) |
| 98n+3 | P1   Q1   R1   S1   T1   U1   V1   W1 |
| 98n+4 | P2   Q2   R2   S2   T2   U2   V2   W2 |
| ⋮ | ⋮   ⋮   ⋮   ⋮   ⋮   ⋮   ⋮   ⋮ |
| 98n+97 | P95 Q95 R95 S95 T95 U95 V95 W95 |
| 98n+98 | P96 Q96 R96 S96 T96 U96 V96 W96 |
| 98(n+1)+1 | |

FIG. 6A

CD IN MODE 1

| CTL | ADR 1 | TNO | INDEX | MIN | SEC | FRAME | 00 | AMIN | ASEC | AFRAME | CRC |

ELAPSED TIME WITHIN PIECE OF MUSIC / ABSOLUTE TIME

CD IN MODE 2

| CTL | ADR 2 | N1 | N2 | N3 | N4 | N5 | N6 | N7 | N8 | N9 | N10 | N11 | N12 | N13 | ZERO | AFRAME | CRC |

FIG. 6C

CD IN MODE 3

| CTL | ADR 3 | I1 | I2 | I3 | I4 | I5 | 00 | I6 | I7 | I8 | I9 | I10 | I11 | I12 | ZERO | AFRAME | CRC |

ISRC (60bits)

| 0 | 0 | TNO | INDEX | ALL ZEROS | CRC |

FIG. 7

| Character | Binary | Octal |
|---|---|---|
| 0 | 000000 | 00 |
| 1 | 000001 | 01 |
| 2 | 000010 | 02 |
| 3 | 000011 | 03 |
| 4 | 000100 | 04 |
| 5 | 000101 | 05 |
| 6 | 000110 | 06 |
| 7 | 000111 | 07 |
| 8 | 001000 | 10 |
| 9 | 001001 | 11 |
| A | 010001 | 21 |
| B | 010010 | 22 |
| C | 010011 | 23 |
| D | 010100 | 24 |
| E | 010101 | 25 |
| F | 010110 | 26 |
| G | 010111 | 27 |
| H | 011000 | 30 |
| I | 011001 | 31 |
| J | 011010 | 32 |
| K | 011011 | 33 |
| L | 011100 | 34 |
| M | 011101 | 35 |
| N | 011110 | 36 |
| O | 011111 | 37 |
| P | 100000 | 40 |
| Q | 100001 | 41 |
| R | 100010 | 42 |
| S | 100011 | 43 |
| T | 100100 | 44 |
| U | 100101 | 45 |
| V | 100110 | 46 |
| W | 100111 | 47 |
| X | 101000 | 50 |
| Y | 101001 | 51 |
| Z | 101010 | 52 |

FIG. 9

U BIT-BASED SUB-CODE

| SUB-CODE SYNC WORD → | 1 | 2 | 3 | 4 | 5 | 6 | 7 | 8 | 9 | 10 | 11 | 12 | |
|---|---|---|---|---|---|---|---|---|---|---|---|---|---|
| | 0 | 0 | 0 | 0 | 0 | 0 | 0 | 0 | 0 | 0 | 0 | 0 | ZERO FRAME |
| | 0 | 0 | 0 | 0 | 0 | 0 | 0 | 0 | 0 | 0 | 0 | 0 | FIRST FRAME |
| | 1 | Q1 | R1 | S1 | T1 | U1 | V1 | W1 | 0 | 0 | 0 | 0 | SECOND FRAME |
| | 1 | Q2 | R2 | S2 | T2 | U2 | V2 | W2 | 0 | 0 | 0 | 0 | THIRD FRAME |
| | . | . | . | . | . | . | . | . | . | . | . | . | ... |
| | 1 | Q96 | R96 | S96 | T96 | U96 | V96 | W96 | 0 | 0 | 0 | 0 | 97TH FRAME |

FIG.14

| | 16bits | | 16bits | | |
|---|---|---|---|---|---|
| | MSB LSB | MSB LSB | MSB LSB | MSB LSB | |
| HEADER { | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| | ClusterH | ClusterL | Sector | 00000010 | 3 |
| | 00000000 | 00000000 | 00000000 | 00000000 | 4 |
| | 00000000 | 00000000 | 00000000 | 00000000 | 5 |
| | 00000000 | 00000000 | 00000000 | 00000000 | 6 |
| | Maker code | Model code | First TNO | Last TNO | 7 |
| | 00000000 | 00000000 | 00000000 | Used Sectors | 8 |
| | 00000000 | 00000000 | 00000000 | 00000000 | 9 |
| | 00000000 | 00000000 | 00000000 | Disc Serial No. | 10 |
| CORRE-SPONDING TABLE DESIG-NATING DATA { | Disc | ID | P-DFA | P-EMPTY | 11 |
| | P-FRA | P-TNO1 | P-TNO2 | P-TNO3 | 12 |
| | P-TNO4 | P-TNO5 | P-TNO6 | P-TNO7 | 13 |
| | P-TNO248 | P-TNO249 | P-TNO250 | P-TNO251 | 74 |
| | P-TNO252 | P-TNO253 | P-TNO254 | P-TNO255 | 75 |
| | 00000000 | 00000000 | 00000000 | 00000000 | 76 |
| | 00000000 | 00000000 | 00000000 | 00000000 | 77 |
| MANAGE-MENT TABLE (255 SLOTS) (01h) | START ADDRESS | | | TRACK MODE | 78 |
| | END ADDRESS | | | LINK INFORMATION | 79 |
| (02h) | START ADDRESS | | | TRACK MODE | 80 |
| | END ADDRESS | | | LINK INFORMATION | 81 |
| (03h) | START ADDRESS | | | TRACK MODE | 82 |
| | END ADDRESS | | | LINK INFORMATION | 83 |
| (FCh) | START ADDRESS | | | TRACK MODE | 580 |
| | END ADDRESS | | | LINK INFORMATION | 581 |
| (FDh) | START ADDRESS | | | TRACK MODE | 582 |
| | END ADDRESS | | | LINK INFORMATION | 583 |
| (FEh) | START ADDRESS | | | TRACK MODE | 584 |
| | END ADDRESS | | | LINK INFORMATION | 585 |
| (FFh) | START ADDRESS | | | TRACK MODE | 586 |
| | END ADDRESS | | | LINK INFORMATION | 587 |

U-TOC SECTOR 0

HCMS MANAGEMENT TABLE

| No. 1 | TRACK ID (OR DISC ID) | TIMER ID |
|---|---|---|
| No. 2 | TRACK ID (OR DISC ID) | TIMER ID |
| ⋮ | ⋮ | ⋮ |
| No. n | | |

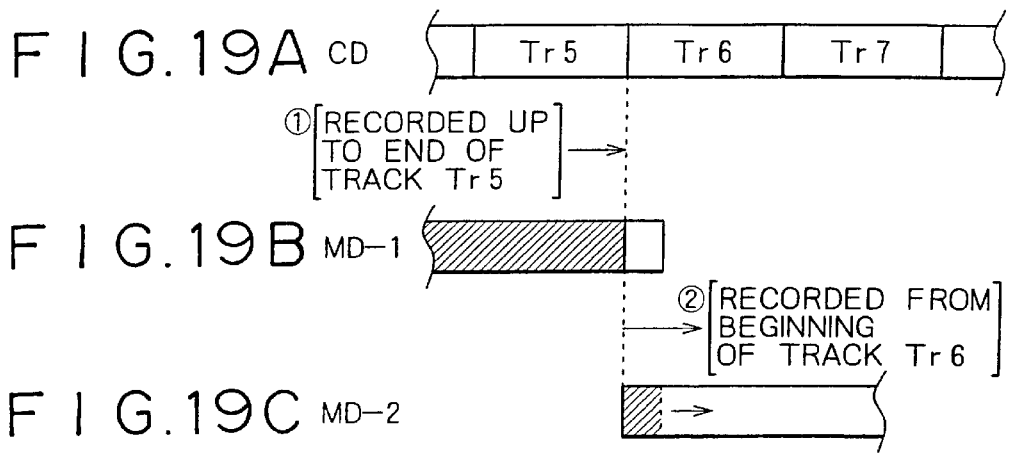
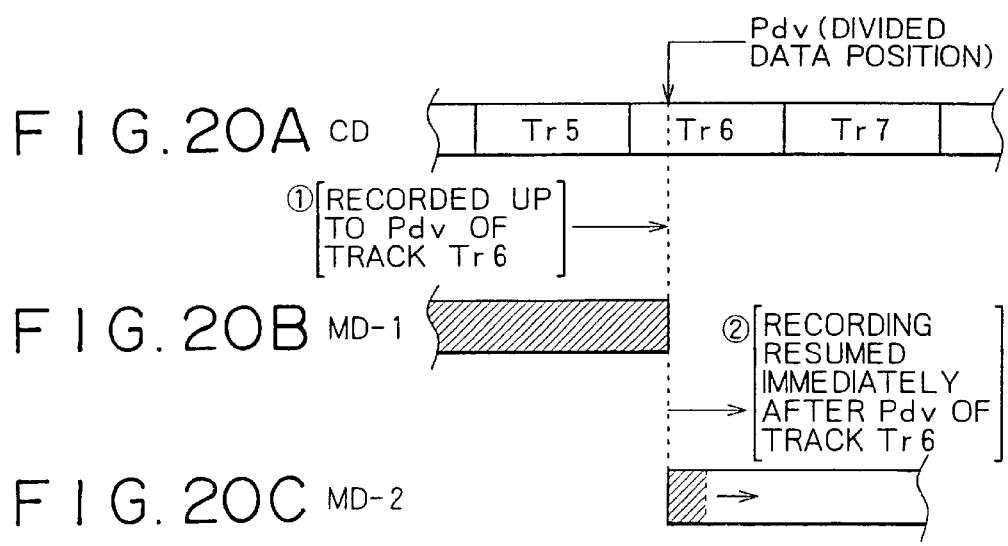

TRACK UNIT RECORDING MODE

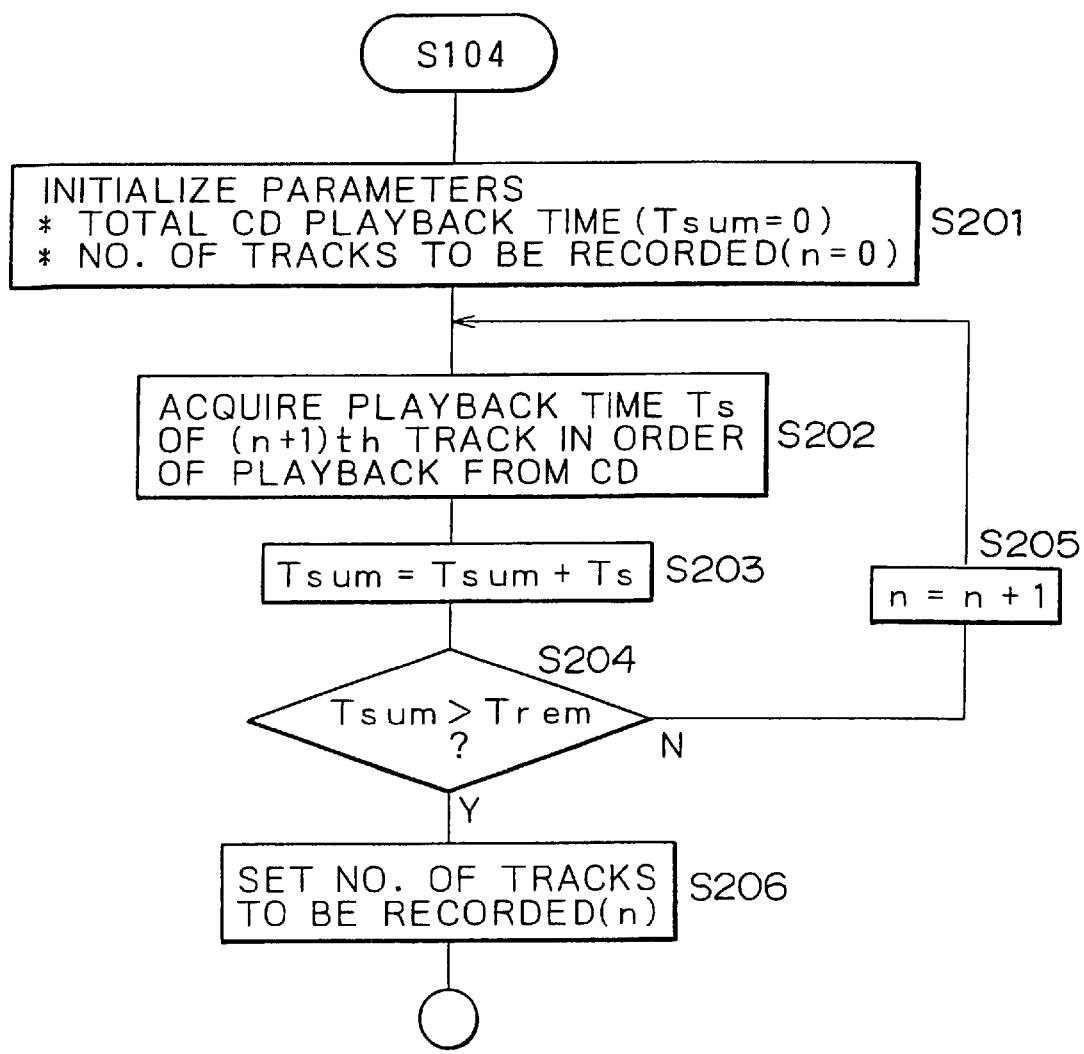

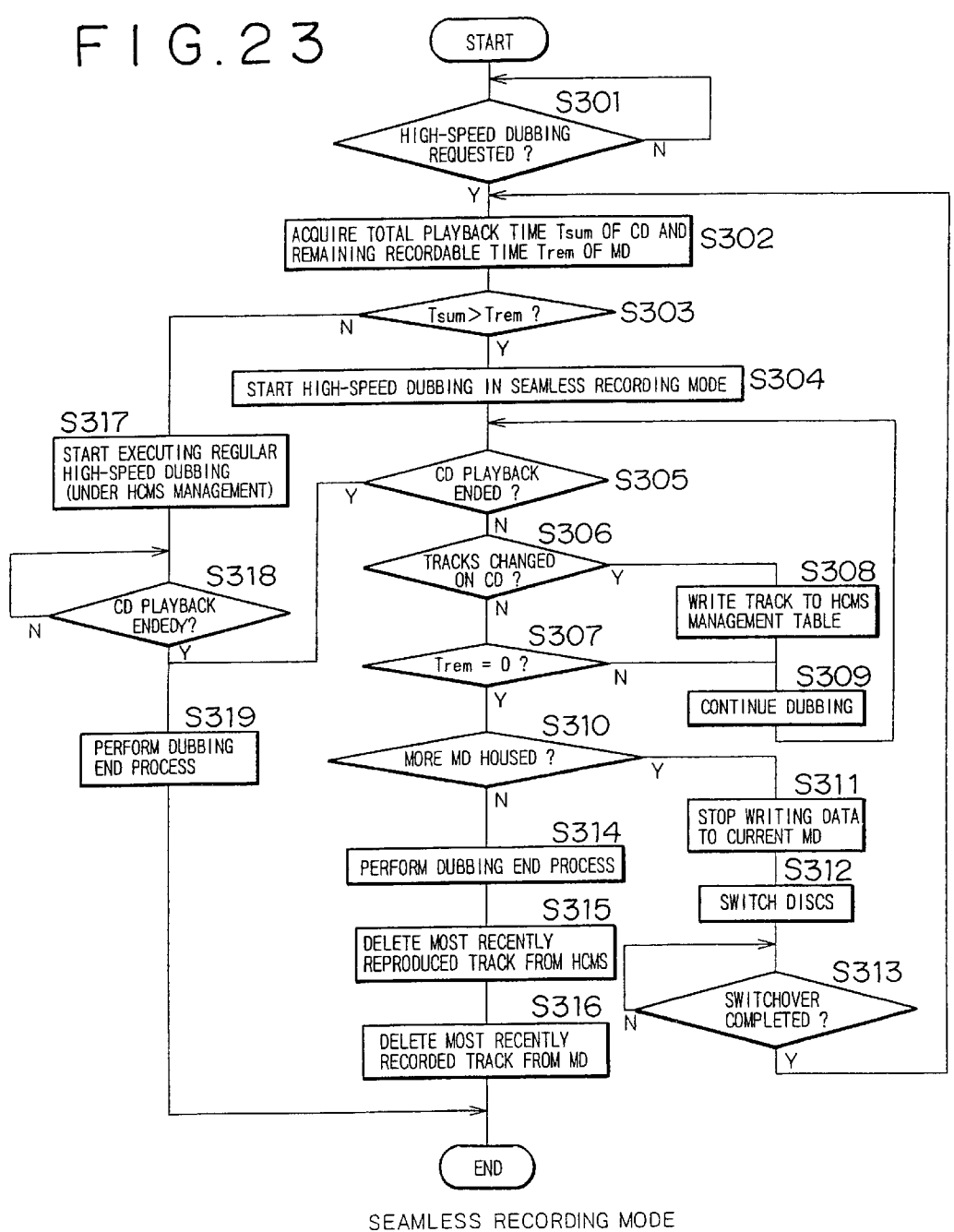
FIG. 23 SEAMLESS RECORDING MODE

DUBBING APPARATUS AND DUBBING METHOD

BACKGROUND OF THE INVENTION

The present invention relates to a dubbing apparatus and a dubbing method. More particularly, the invention relates to a dubbing apparatus and a dubbing method designed for copyright protection using functions to manage program data to be dubbed.

In recent years, CD players for playing back CDs (compact discs; registered trademark) have come into general use. Concurrently gaining widespread acceptance are disc media such as Mini-disc (MD; registered trademark) to and from which audio data are recorded and reproduced, as well as recording and reproducing apparatuses for handling such disc media. Today, audio systems combining an MD recorder/player addressing the MD with a CD player are receiving widespread use.

The MD recorder/player, CD player, and systems combining these devices manage audio data in units of so-called programs. In this specification, a program refers to a group of data recorded and managed as a data unit on the disc. Illustratively, one piece of music (generally known as a track) represents one program of audio data. In the description that follows, the words "programs" and "tracks" will be used interchangeably.

Audio systems of the above-described type are generally capable of what is known as dubbing recording, i.e., a procedure for recording audio data reproduced by a CD player onto an MD in an MD recorder/player. Some systems are designed to offer so-called high-speed dubbing so as to shorten the time of dubbing recording.

In high-speed dubbing mode, the CD player controls its disc drive control portion and its reproduced signal processing portion in such a manner as to reproduce data from a CD at a predetermined multiple-fold speed, i.e., a speed multiplying the standard speed by a predetermined value. On the side of the MD recorder/player, its recording circuit portion is controlled to operate in keeping with the multiple-fold playback speed for the CD in question so as to receive audio data from the CD player for recording onto an MD.

Illustratively, for equipment combining a CD player (reproducing apparatus) integrally with an MD recorder/player (recording apparatus), it is easy to control the two devices concurrently at the predetermined multiple-fold speed for high-speed dubbing. If the recording apparatus is physically separated from the recording apparatus, the two may still be connected via a control cable or the like for interactive communication therebetween, whereby operation of the two devices is readily controlled in synchronism for high-speed dubbing.

The act of dubbing involves duplicating copyrighted materials such as pieces of music and is thus regarded by those concerned as detrimental to copyright holders' benefits. From their point of view, dubbing is an act that should be discouraged and if possible prohibited.

The fact is that there is widespread practice of dubbing at speeds higher than the standard speed. That means there have been trends toward greater numbers of pieces of music (tracks) dubbed per unit time at higher speeds than at the standard speed.

Suppose that a user copies one CD or one of the pieces of music (tracks) on the CD onto MDs which are so numerous that they exceed the reasonably expected range of personal use, and that the user sells the multiplied MDs containing the same contents to third parties. This is a violation of copyrights.

In that case, if the user employs a high-speed dubbing function to copy pieces of music (tracks) to MDs at a higher speed, the MDs will be prepared more efficiently than if the copying is done at the standard speed. That is, the high-speed dubbing function can encourage the infringement of copyrights.

Under such circumstances, a standard called HCMS (High-speed Copy Management System) has been proposed. HCMS stipulates that when digital sound sources such as a CD are recorded at high speed to media such as MDs, any one track (piece of music) once dubbed at high speed is to be inhibited from being dubbed again at high speed for at least 74 minutes starting from the time the track in question began to be dubbed at high speed. The high-speed dubbing inhibited time is set for 74 minutes because the maximum playback time of a CD is nominally 74 minutes. In other words, high-speed dubbing is suppressed during the period of time required normally to play back an entire CD. This measure is designed to keep the efficiency of dubbing per track substantially the same as in standard-speed dubbing.

HCMS-compatible apparatuses are structured to ensure that any one track, once dubbed at high speed, will not be dubbed again at high speed within 74 minutes of the point in time at which the track in question began to be dubbed. One such HCMS-compatible apparatus proposed by this applicant is incorporated by reference in U.S. patent application Ser. No. 09/520,116 filed on Mar. 6, 2000, now U.S. Pat. No. 6,298,022.

FIGS. 1A, 1B and 1C are explanatory views showing how data reproduced from a CD are recorded to an MD at high speed. FIG. 1A indicates a remaining recordable time of the MD, i.e., the recordable capacity of the MD expressed in temporal terms. FIG. 1B depicts typical recorded contents of a CD which is a source of recording. In this example, at least seven tracks Tr1 through Tr7, etc., are shown recorded on the CD.

It is assumed that the CD in FIG. 1B is played back in ascending order of track numbers starting from track Tr1 and that the reproduced data are recorded at high speed to the MD shown in FIG. 1A.

As illustrated in FIG. 1A, the remaining recordable time of the MD corresponds to the total playback time of tracks Tr1 through Tr5 plus the time it takes to reproduce data halfway through the next track Tr6 on the CD.

When the recording is allowed to proceed until the recordable time of the MD is exhausted, each of the tracks Tr1 through Tr5 among those in FIG. 1B is fully recorded from start position to end position whereas the track Tr6 is recorded only up to a halfway position.

As a result, under HCMS provisions, the tracks Tr1 through Tr6 are subject to HCMS management as shown in the lower part of FIG. 1B. That is, the tracks Tr1 through Tr5 each fully accommodated by the MD are inhibited from getting dubbed again at high speed for at least 74 minutes from the time each track began to be recorded. The track Tr6, a part of which has been recorded, is also subject to HCMS management. As shown schematically in FIG. 1C, the track Tr6 applicable to HCMS management is inhibited from getting recorded onto a newly loaded MD at high speed for the next 74 minutes.

When, according to HCMS requirements, the partially recorded track Tr6 is also subject to HCMS management as shown in FIG. 1B, some inconveniences are bound to result as will be described below with reference to FIG. 2A through 2C and 3A through 3C.

FIG. 2A shows part of the same recorded contents of the CD as those shown in FIG. 1B. FIG. 2B schematically depicts MD-1, i.e., part of the same MD shown in FIG. 1A.

Suppose that the data reproduced from the CD are recorded at high speed to MD-1 as in the case of FIG. 1A. In that case, the recordable capacity of MD-1 is exhausted and the recording comes to an end when the track Tr6 has been partially recorded.

Suppose now that the user wants to record the unrecorded portion of the CD shown in FIG. 2A to another MD within a relatively short time following the just-ended recording operation. Frequently such eventualities can occur in which the contents of one CD are desired to be recorded to a plurality of MDs.

In the situation depicted in FIGS. 2A and 2B, for example, the partially recorded track Tr6 is an extra on MD-1, i.e., a portion not really necessary on that particular MD from the user's point of view. Usually the user wants to record the track Tr6 in its entirety from the start position to a new MD at high speed.

However, having been partially recorded to MD-1, the track Tr6 is now inhibited from getting recorded again soon afterwards at high speed under HCMS management. That means it is prohibited to record the track Tr6 from its start position to MD-2 (a new MD) at high speed within a predetermined period of time (74 minutes) after the recording to MD-1, as depicted in FIG. 2C.

The MD recorder/player is designed to accumulate recordable data temporarily in its buffer memory before writing the data to an MD. That design permits so-called seamless recording whereby a group of recordable data is recorded in a seamless, uninterrupted manner to a plurality of MD's. A scheme of such seamless recording proposed by this applicant is incorporated by reference in U.S. patent application Ser. No. 09/315,235 filed May 20, 1999, now U.S. Pat. No. 6,272,088. To carry out seamless recording requires the use of a changer type MD recorder capable of accommodating a plurality of MDs and loading them one by one for recording.

FIGS. 3A through 3C indicate an example of seamless recording. FIGS. 3A and 3B show how high-speed dubbing is performed in the same manner as in FIGS. 2A and 2B. That is, the recordable capacity of MD-1 has been used up with track Tr6 on the CD partially recorded.

Illustratively, suppose that the recording of data to MD-1 has ended as shown in FIG. 3B. With seamless recording in effect, recording of data to the next disc MD-2 begins from the position next to the end position of track Tr6 on MD-1, as depicted in FIG. 3C.

According to HCMS provisions, if transition from MD-1 to MD-2 is regarded as resumption of the current recording operation, the track Tr6 is barred from getting dubbed at high speed because the track Tr6 was already subject to HCMS management when its recording began on MD-1. In such a case, it is impossible to continue seamless recording of the interrupted contents from one MD to another at high speed.

As outlined above, high-speed dubbing under HCMS provisions can result in some inconveniences particularly when stored contents of one CD are recorded to a plurality of MDs. That is, any one track becomes subject to HCMS management even it has been recorded only partially on one MD in high-speed mode. It is impossible to dub the track in question soon afterwards to a new MD at high speed.

The injunction is unreasonable from the user's point of view. The benefits of the dubbing function appear to be restricted more than is reasonably deemed necessary.

SUMMARY OF THE INVENTION

It is therefore an object of the present invention to overcome the above and other deficiencies of the prior art and to provide, with copyright protection duly taken into account, a dubbing apparatus and a dubbing method for averting cases of inconveniences in which, when one recordable source is to be recorded to two storage media, any program (track) partially recorded earlier on one storage medium is barred from being dubbed soon afterwards to the next storage medium.

In carrying out the invention and according to one aspect thereof, there is provided a dubbing apparatus for dubbing, at a predetermined speed higher than a standard dubbing speed, programs reproduced from a first storage medium serving as a dubbing source onto a second storage medium acting as a dubbing destination, the first storage medium including a program area and a management area, the program area having a plurality of programs recorded therein, the management area retaining management information for managing the programs stored in the program area, the dubbing apparatus comprising: a comparing element for comparing a total amount of data constituting programs to be dubbed at the higher speed among the plurality of programs recorded on the dubbing source first storage medium, with a recordable capacity of the dubbing destination second storage medium; a recording controlling element which, if the comparing element judges that the total amount of the data constituting the programs to be dubbed from the dubbing source first storage medium is greater than the recordable capacity of the dubbing destination second storage medium, then dubs at the higher speed at least the programs that are recordable each in its entirety onto the dubbing destination second storage medium within the recordable capacity thereof; and a storing element for storing a disable flag and an enable flag, the disable flag inhibiting for a predetermined period of time a new session of dubbing at the higher speed of each of the programs that have been recorded each in its entirety at the higher speed onto the dubbing destination second storage medium, the enable flag allowing a program not accommodated in its entirety by the dubbing destination second storage medium to be dubbed consecutively at the higher speed.

According to another aspect of the invention, there is provided a dubbing method for dubbing, at a predetermined speed higher than a standard dubbing speed, programs reproduced from a first storage medium serving as a dubbing source onto a second storage medium acting as a dubbing destination, the first storage medium including a program area and a management area, the program area having a plurality of programs recorded therein, the management area retaining management information for managing the programs stored in the program area, the dubbing method comprising the steps of: comparing a total amount of data constituting programs to be dubbed at the higher speed among the plurality of programs recorded on the dubbing source first storage medium, with a recordable capacity of the dubbing destination second storage medium; if the total amount of the data constituting the programs to be dubbed from the dubbing source first storage medium is judged to be greater than the recordable capacity of the dubbing destination second storage medium, then dubbing at the higher speed at least the programs that are recordable each in its entirety onto the dubbing destination second storage medium within the recordable capacity thereof; and storing a disable flag and an enable flag, the disable flag inhibiting for a predetermined period of time a new session of dubbing at the higher speed of each of the programs that have been recorded each in its entirety at the higher speed onto the dubbing destination second storage medium, the enable flag allowing a program not accommodated in its entirety by the dubbing destination second storage medium to be dubbed consecutively at the higher speed.

Other objects, features and advantages of the invention will become more apparent upon a reading of the following description and appended drawings.

BRIEF DESCRIPTION OF THE DRAWINGS

FIG. 1A is a schematic view of a recordable area on an MD used as a recordable medium;

FIG. 1B is a schematic view of a storage area on a CD used as a read-only medium, the area containing target tracks to be dubbed;

FIG. 1C is a schematic view of a track inhibited from high-speed dubbing for a predetermined period of time;

FIG. 2A is a schematic view of a storage area on a CD used as a read-only medium, the area containing target tracks to be dubbed;

FIG. 2B is a schematic view of tracks recorded onto a first MD used as a recordable medium;

FIG. 2C is a schematic view of a position at which to start recording a track consecutively on a second MD used as another recordable medium following the first MD;

FIG. 3A is a schematic view of a storage area on a CD used as a read-only medium, the area containing target tracks to be recorded;

FIG. 3B is a schematic view of tracks recorded onto a first MD as a recordable medium;

FIG. 3C is a schematic view showing a position at which to start recording a track consecutively on a second MD as another recordable medium following the first MD;

FIG. 4 is a schematic view of a frame structure comprising data stored on a CD used as a read-only medium;

FIG. 5 is a schematic view of a block structure comprising data stored on a CD used as a read-only medium;

FIG. 6A is a schematic view of a Q channel data structure in mode 1 on a CD as a read-only medium;

FIG. 6B is a schematic view of a Q channel data structure in mode 2 on the CD;

FIG. 6C is a schematic view of a Q channel data structure in mode 3 on the CD;

FIG. 6D is a schematic view of a Q channel data structure on an MD used as a read-only medium;

FIG. 7 is a code table listing codes for expressing alphanumeric characters;

FIG. 9 is a table of sub-code information expressed in U bits;

FIG. 14 is a schematic view of a data structure in U-TOC sector 0 on an MD used as a recordable medium, the sector containing MD management information;

FIG. 18A is a schematic view of a storage area on a CD used as a read-only medium, the area containing target tracks to be dubbed;

FIG. 18B is a schematic view of tracks recorded onto a first MD as a recordable medium;

FIG. 18C is a schematic view showing a position at which to start recording a track consecutively on a second MD as another recordable medium following the first MD, the track having been already recorded only in part to the first MD;

FIG. 19A is a schematic view of a storage area on a CD used as a read-only medium, the area containing target tracks to be dubbed;

FIG. 19B is a schematic view of tracks recorded onto a first MD as a recordable medium;

FIG. 19C is a schematic view of a first example in which a track is first recorded to the first MD and then to a second MD consecutively;

FIG. 20A is a schematic view of a storage area on a CD used as a read-only medium, the area containing target tracks to be dubbed;

FIG. 20B a schematic view of tracks recorded onto a first MD as a recordable medium;

FIG. 20C is a schematic view of a second example in which a track is first recorded to the first MD and then to a second MD consecutively;

FIG. 22 is a flowchart of steps constituting a routine for comparing a playing time of a CD as a readonly medium with a recordable time of an MD as a recordable medium; and FIG. 23 is a flowchart of steps constituting a control routine for use in a seamless recording mode.

DESCRIPTION OF THE PREFERRED EMBODIMENTS

Figures 8A, 8B:
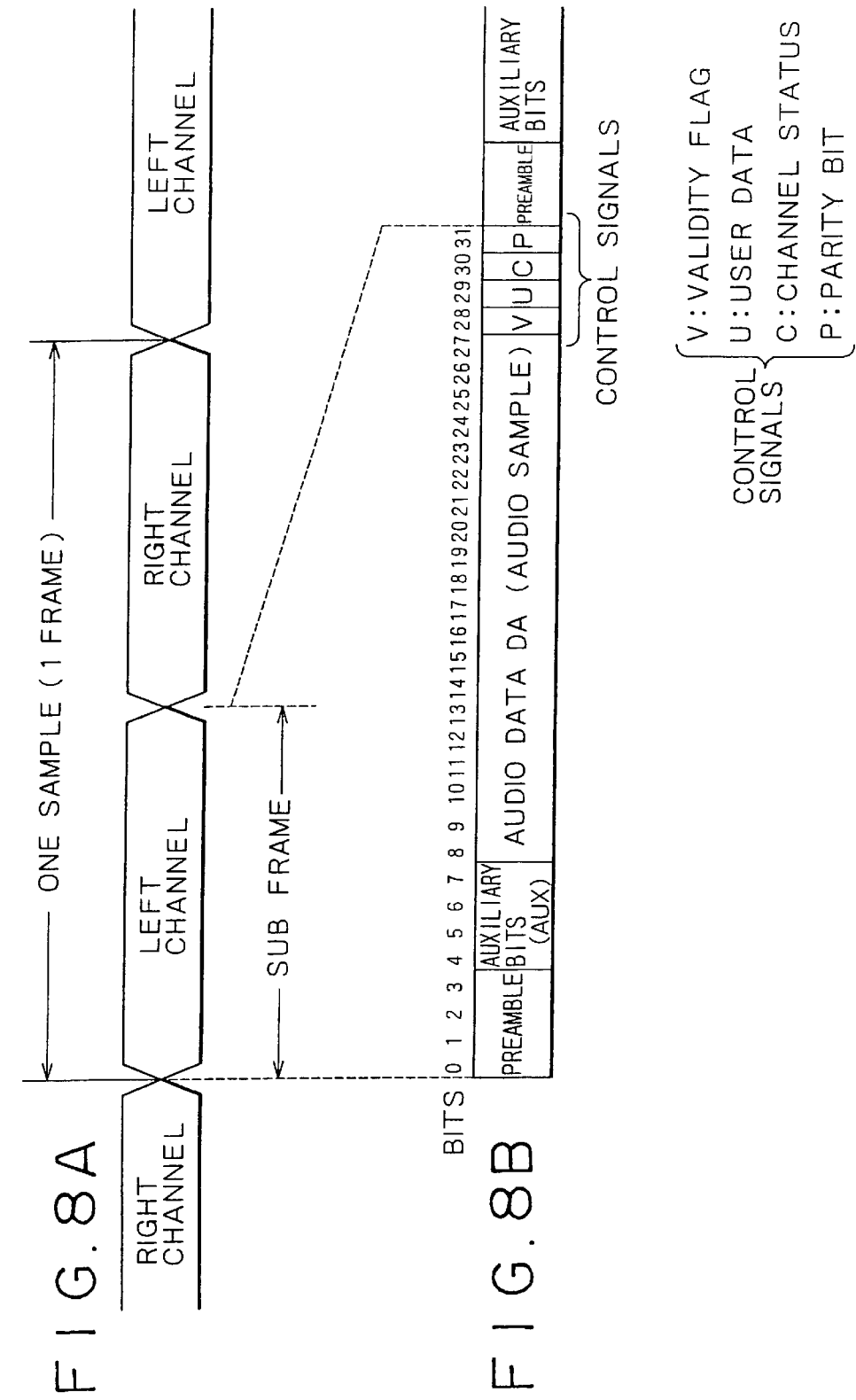
FIG. 8A is a schematic view of a data string of one frame cycle in a digital audio interface format.
FIG. 8B is a schematic view of a sub-frame data structure.

Preferred embodiments of this invention will now be described by referring to the accompanying drawings. One typical recording apparatus embodying the invention is an MD (Mini-disc) recorder/player capable of dubbing. A CD (compact disc) player is a typical reproducing apparatus that supplies audio data as a recording source during dubbing. The MD recorder/player and the CD player, to be described below, may be either integrally formed or separately furnished and connected at the time of dubbing.

The description of how the invention is typically embodied will be given under the following headings:

1. Sub-code
2. Digital Audio Interface
3. CD-MD Dubbing System
3-1. Structure of MD Recorder/Player
3-2. MD Track Format
3-3. U-TOC
3-4. Structure of CD Player
4. Typical Operations under HCMS Management
5. High-speed Dubbing by the Embodiment
5-1. Basic Concept of Dubbing by the Embodiment
5-2. Track Unit Recording Mode and Seamless Recording Mode
5-3. Processing in Track Unit Recording Mode
5-4. Processing in Seamless Recording Mode

1. Sub-code

A sub-code recorded on a CD (compact disc) and an MD (Mini-disc) is described below with reference to FIGS. 4, 5, 6A through 6D, and 7.

In the CD system, as is well known, a single unit of recorded data constitutes one frame, and 98 frames make up one block. A typical structure of the frame is shown in FIG. 4. As illustrated, one frame is composed of 588 bits: the first 24 bits constitute synchronizing data and the next 14 bits a sub-code data area followed by data and parity bits.

Each block is made up of 98 frames each having the above structure. Sub-code data extracted from the 98 frames are arranged into single-block sub-code data depicted in FIG. 5.

Of the 98 frames, the first and the second frame (frames 98$n$+1 and 98$n$+2) yield sub-code data that form synchronizing patterns (S0, S1). The third through the 98th frame (frames 98$n$+3 through 98$n$+98) each constitute 96-bit channel data, i.e., sub-code data P, Q, R, S, T, U, V and W.

In the case of a CD-DA (digital audio) disc, the P and Q channel data are used for access management. Specifically, the P channel represents pauses between tracks whereas the Q channel (bits Q1 through Q96) permits more sophisticated controls. The 96-bit Q channel data are structured as illustrated in FIGS. 6A, 6B and 6C.

As is well known, the Q channel data for the CD fall into three modes: mode 1, mode 2 and mode 3. The data contents are different form one mode to another.

Below is a description of the Q channel data for the CD classified as mode 1 in FIG. 6A.

As shown in FIG. 6A, the first four bits Q1 through Q4 in the Q channel data constitute control data CTL that are used to represent the number of audio channels, presence or absence of emphasis, and CD-ROM identification.

The four-bit control data are defined as follows:

"0***" . . . two-channel audio
"1***" . . . four-channel audio
"*0**" . . . CD-DA (CD digital audio)
"*1**" . . . CD-ROM
"**0*" . . . digital copy prohibited
"**1*" . . . digital copy permitted
"***0" . . . pre-emphasis not provided
"*1" . . . pre-emphasis provided The control data CTL have their bits set as required for each specific CD. This holds true for the control data CTL (bits Q1 through Q4) among the Q channel data classified as modes 2 and 3**, to be described later.

The next four bits Q5 through Q8 are address bits ADR. They are used as control bits for data bits Q9 through Q80.

When the four address bits are "0001" ("1" in decimal notation), they signify that the next bits Q9 through Q80 make up sub-Q data for an audio CD in mode 1. The 72 bits Q9 through Q80 are used as the sub-Q data while the remaining bits Q81 through Q96 are used for CRC (cyclic redundancy check).

The 72 bits Q9 through Q80 as sub-code contents carry information divided in units of eight bits, as shown in FIG. 6A. Recorded at the top is a track number (TNO) that is one of tracks "01" through "99." In a lead-out area, the track number is "AA".

The track number is followed by an index (INDEX) that divides the track in question into smaller portions.

The index is followed by MIN (minutes), SEC (seconds) and FRAME (frame number) indicating an elapsed time within the track.

The elapsed time is followed by an absolute time address recorded in minutes (AMIN), seconds (ASEC) and a frame number (AFRAME). An absolute time address is time information which denotes zero minute, zero second and zero frame at the start point of a first track and which is furnished uninterruptedly up to the lead-out area. This is absolute address information for managing each track on the disc.

FIG. 6B depicts a structure of Q channel data classified as mode 2. In this example, the address ADR (bits Q5 through Q8) of the Q channel data in mode 2 is given as "0010" ("2" in decimal notation). This indicates that the ensuing sub-Q data (bits Q9 through Q80) are data contents of an audio CD in mode 2.

The sub-Q data (Q9 through Q80) in mode 2 accommodate 13 digits N1 through N13 (4×13=52 bits). The data N1 through N13 are followed by a zero-bit segment which in turn is followed by an absolute time frame number (AFRAME) and a CRC.

The data N1 through N13 constitute information identifying a product number of the CD in question. The data are typically used for bar coding.

FIG. 6C shows a structure of Q channel data classified as mode 3. Under CD-related provisions, the Q channel data in mode 3 are allowed to be inserted once into every consecutive 100 sub-coding blocks at the most.

An address ADR (bits Q5 through Q8) of the Q channel data in mode 3 is given as "0011" ("3" in decimal notation). This address indicates that the ensuing sub-Q data (Q9 through Q80) constitute Q data contents of an audio CD in mode 3.

A sub-Q data area made up of bits Q9 through Q80 in mode 3 accommodates an ISRC (International Standard Recording Code) constituted by 60 bits of data I1 through I12.

The ISRC provides information affording a specific number (identifier) to a track carrying a piece of music. Illustratively, the ISRC serves as an international standard code for identifying each piece of music (track) recorded on a CD for copyright management.

The ISRC is followed by a zero-bit segment which in turn is followed by an absolute time frame number (AFRAME) and a CRC.

Of the data I1 through I12 constituting the ISRC, the data I1 through I5 are each made up of six bits. As shown in FIG. 7, values represented by the six bits correspond to characters in a predetermined format. The data I6 through I12 are each composed of four bits that denote characters in BCD (binary code decimal code) format. A two-zero-bit segment is inserted interposingly between the data I1 through I5 on the one hand and the data I6 through I12 on the other hand.

The data I1 and I2 made up of 12 bits constitute a country code. This is a code that identifies country names using any two characters among those defined in FIG. 7.

The data I3 through I5 composed of 18 bits constitute an owner code. The code is capable of identifying as many as 24,480 owners using two alphabetic characters and two alphanumeric characters according to the definitions in FIG. 7.

The eight-bit data I6 and I7, each data item made of four bits, represent a year of recording by two digits in BCD format.

The 20-bit data I8 through I12, each data item composed of four bits, denote a serial number of recording of the track in question by four digits in BCD format.

The ISRC constituted by the above data is inserted as a sub-code having specific values for each track. This is how the tracks are identified on the CD.

There are two kinds of MDs: an MD in the form of a read-only optical disc containing pits, and an MD as a magneto-optical disc which comprises grooves and to and from which data may be written and read. FIG. 6D shows a structure of Q channel data for the read-only MD. A track number (TNO), index information (INDEX) and a CRC code are provided on the MD but not time information. The areas corresponding to the control data CTL (bits Q1 through Q4) and address ADR (bits Q5 through Q8) are filled with "0000" each.

2. Digital Audio Interface

Described below is a format used to transmit data through a digital audio interface between a plurality of digital audio devices. FIGS. 8A and 8B show a digital audio interface format (called the I/O format hereunder) that complies with IEC 958 provisions.

In the I/O format, as shown in FIG. 8A, one sampling period (1/FS) is regarded as one frame that forms a basic unit. In a single frame, a digital output signal ranging from the LSB (least significant bit) to the MSB (most significant bit) is transmitted first over the left (L) channel and then over the right (R) channel.

The data corresponding to each channel are called a sub-frame. FIG. 8B depicts a structure of a sub-frame. One sub-frame is made up of 32 bits. Two sub-frames, i.e., one on the left channel and the other on the right, constitute a single frame.

The first four bits of a sub-frame are called a preamble that is used for synchronization and sub-frame identification.

The next four bits are auxiliary bits (AUX), followed by 20-bit audio data DA constituting main data.

The audio data DA are followed by four control data bits V, U, C and P.

The V bit is a validity flag. When set to "0", the flag indicates that the sub-frame in question has valid (reliable) data; when set to "1," the flag denotes the invalid (unreliable) nature of the sub-frame data. The validity flag allows a receiving-side device to pass judgments in connection with its data processing operations.

The U bit represents user data. From each sub-frame carrying the U bit, 1,176 bits are extracted on average to form control data, i.e., a sub-code shown illustratively in FIG. 9.

Sub-code synchronizing patterns shown in FIG. 5 are provided corresponding to a zero frame and a first frame. As illustrated in FIG. 9, each frame carrying a U bit is made of 12 bits. In this example, the last four bits in each frame are dummy bits.

The second frame through the 97th frame that follow are each headed by a start bit of "1" followed by the sub-code data Q through W shown in FIG. 5 and by four-bit dummy data.

That is, U bits are filled with the sub-code data Q through W taken unmodified from a CD or Mini-disc on the reproducing side. Although the example of FIG. 9 shows two start bits are 12 bits apart, the distance may be varied between 8 and 16 bits by changing the number of dummy bits.

Figure 10:
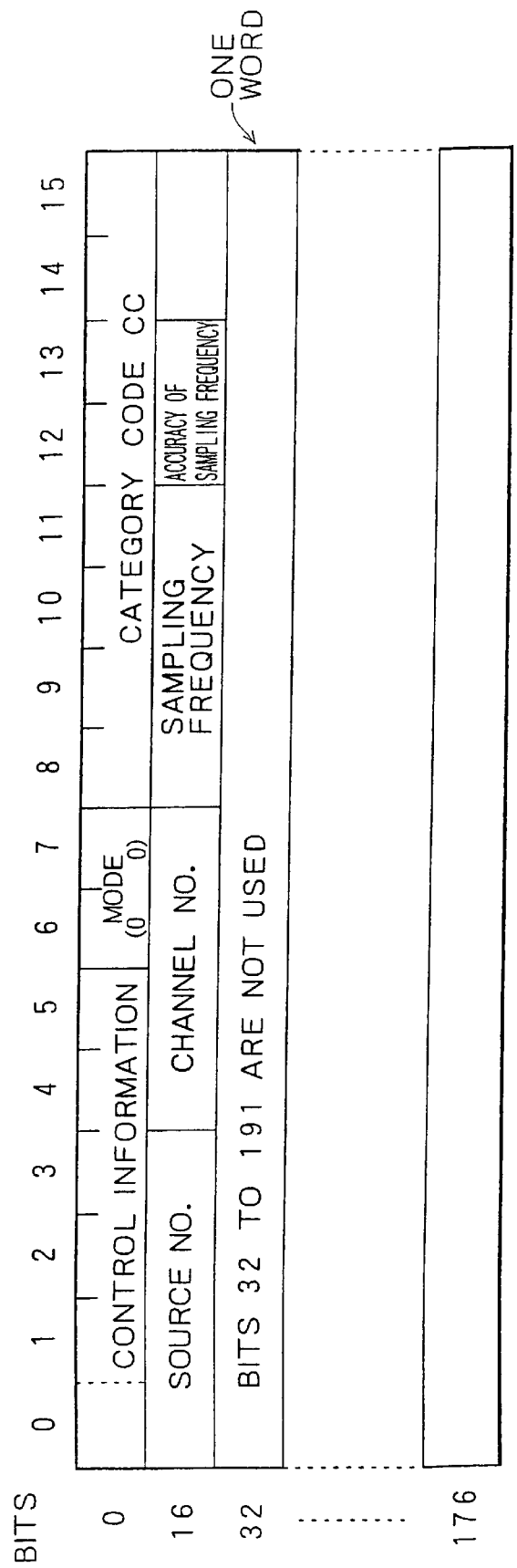
FIG. 10 is a table of channel status information expressed in C bits.

The C bit shown in FIG. 8B represents channel status data. The channel status is defined by a data format comprising as many as 192 C bits (i.e., one word) from each of the sub-frames. FIG. 10 depicts a channel status format.

The first bit (bit 0) of one word indicates whether the transmitting device is a consumer model or a commercial model. The next five bits (bits 1 through 5) contain control information. Illustratively, bit 2 is a copyright protection identification bit, and bit 3 is an emphasis provision identification bit.

Bits 8 through 15 make up a category code CC. Bit 15 is called an L bit representing a generation of digital audio data. Generally, bit 15 is set to "1" to represent commercially issued recorded software. Bits 8 through 14 are filled with specific code settings depending on the transmitting device.

Illustratively, if the transmitting device is a Mini-disc system, the category code CC is set for "1001001L"; if the transmitting device is a compact disc system, the category code is set for "100000L."

Bits 16 through 19 constitute a source number. Where multiple devices of the same category are interconnected, each device is identified by its source number.

Bits 20 through 23 form a channel number. That is, the bits identify the channel type in the digital audio interface.

Bits 24 through 27 are assigned a sampling frequency identification code, and bits 28 and 29 define a degree of sampling frequency accuracy.

Bit 32 and subsequent bits are not used.

The P bit shown in FIG. 8B is a parity bit. Illustratively, an even parity scheme is adopted whereby checks are made on the auxiliary bits, audio data bits DA, and the V, U and C bits for error detection.

3. CD-MD Dubbing System 3-1. Structure of MD Recorder/Player

In a CD-MD dubbing system embodying the invention, a typical structure of an MD recorder/player acting as a recording apparatus of the system is described below by referring to FIGS. 11 and 12.

Figure 12:
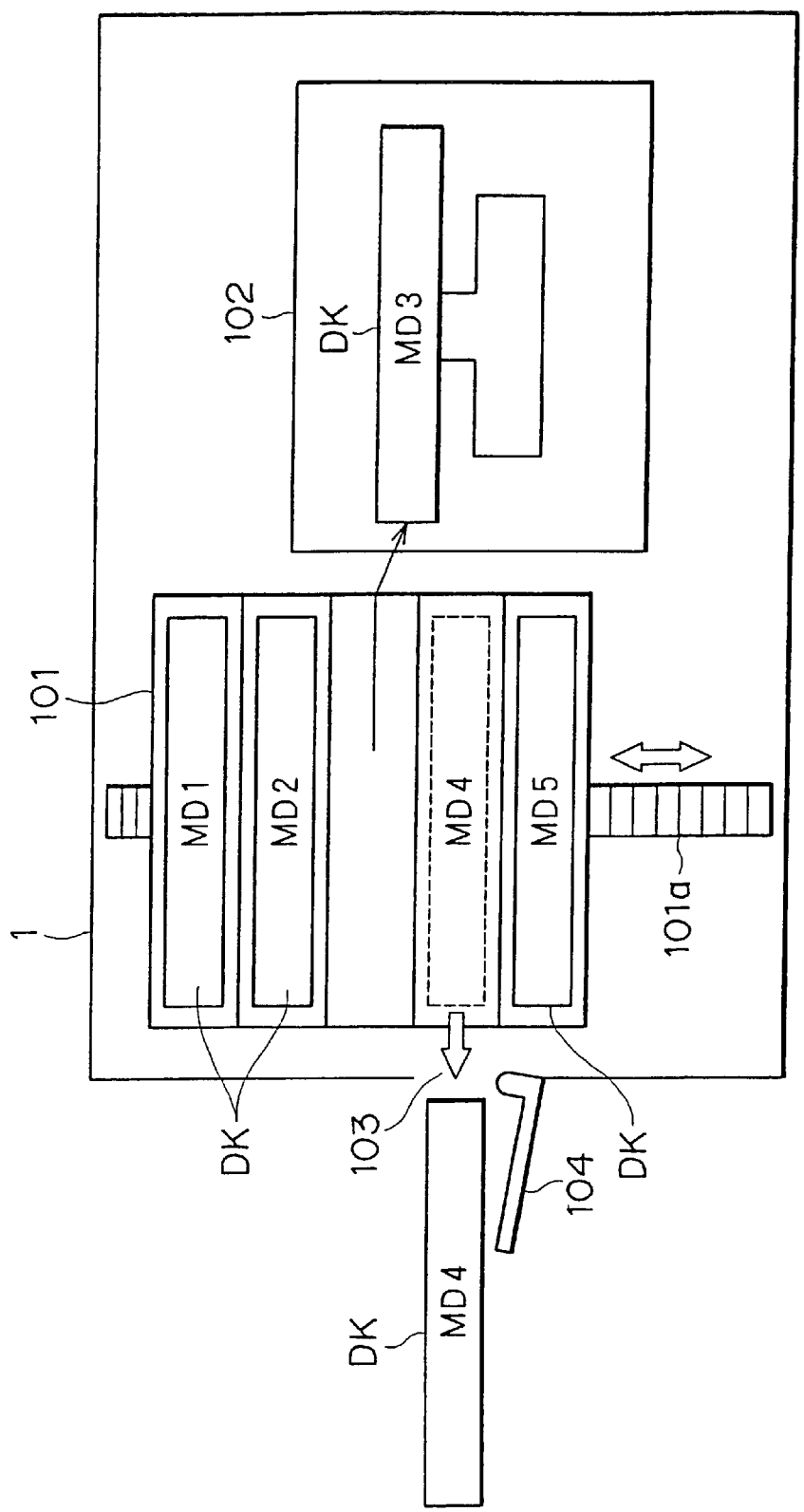
FIG. 12 is a schematic view showing a typical structure of the changer type disc recording and reproducing apparatus of the invention.

As shown in FIG. 12, the MD recorder/player 1 is composed of a stocker 101 and a recording and reproducing unit 102. MDs (Mini-discs) for use with the recorder/player 1 are known magneto-optical discs each housed in a disc cartridge.

The stocker 101 is capable of stocking a predetermined number of disc cartridges DK as sketched in FIG. 12. Illustratively, five disc stocking positions MD1 through MD5 are provided to accommodate up to five disc cartridges.

Any one of the stocked disc cartridges DK is transported from the stocker 101 to a recording and reproducing position within the recording and reproducing unit 102, or moved from the recording and reproducing position back to the stocker 101. The transport may be accomplished automatically illustratively under control of a system controller 11, to be described later.

In order to eject any one of the disc cartridges from the stocker 101, the user first selects the desired disc position among the positions DM1 through DM5 and carries out an ejecting operation. In response, a lid 104 opens, allowing the disc cartridge DK to be ejected from the selected disc stocking position through a slit of a disc loading and unloading unit 103. In FIG. 12, the disc cartridge DK4 is shown ejected from the disc position MD4.

To load a disc cartridge DK into the stocker 101 from outside the MD recorder/player 1, the user selects one of the disc stocking positions MD1 through MD5 and inserts the desired disc cartridge into the disc loading and unloading unit 103 through the opened lid 104. That is, the MD recorder/player 1 of this embodiment has a so-called disc changer function.

A vertical transport facility 101a is provided illustratively to move the stocker 101 in the vertical direction. The facility 101 transports the stocker 101 to a height corresponding to the recording and reproducing position or to the disc loading and unloading unit 103 so that a disc cartridge is moved between the stocker 101 and the recording and reproducing position or between the outside and the stocker 101 for disc loading and unloading purposes, as described above.

Operations of the stocker 101 may also be controlled by the system controller 11.

Figure 11:
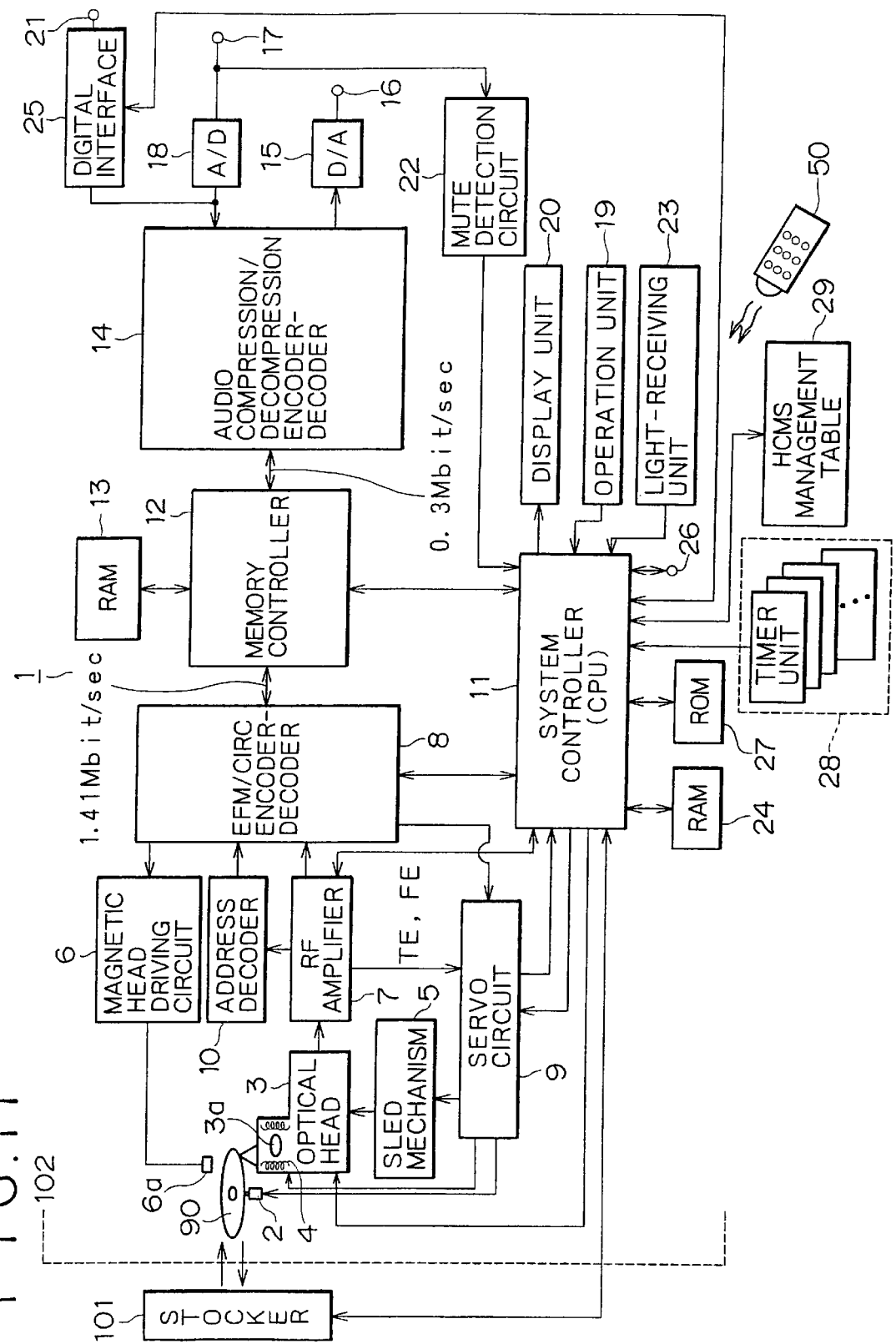
FIG. 11 is a block diagram of a changer type disc recording and reproducing apparatus applicable to this invention.

FIG. 11 is a block diagram showing an internal structure of the recording and reproducing unit 102, i.e., the MD recorder/player 1 embodying the invention. This MD recorder/player 1 is capable of writing and reading audio data to and from a magneto-optical disc (MD) 90.

The MD 90 in FIG. 11 refers to a disc housed in the disc cartridge DK transported from the stocker 101 in FIG. 12 to the recording and reproducing position.

For a recording or reproducing operation, the MD 90 in the disc cartridge is exposed to a light beam from an optical head 3 and to a magnetic field from a magnetic head with a shutter mechanism of the cartridge opened from its closed position for exposure.

The MD 90 is rotated at a constant linear velocity (CLV) by a spindle motor 2.

The recording and reproducing position as used in this specification signifies a position in which the MD 90 is rotatably retained by the spindle motor 2.

The optical head 3 is positioned in symmetric relation to the magnetic head 6a across the loaded magneto-optical disc 90. The optical disc comprises an objective lens 3a, a dual-axis mechanism 4, a semiconductor laser unit (not shown), and a light-receiving unit that receives reflected light from the surface of a magneto-optical disc under semiconductor laser emission.

The dual-axis mechanism 4 has a focusing coil and a tracking coil. The focusing coil acts to drive the objective lens 3a in such a manner that the lens moves close to or away from the magneto-optical disc 90. The tracking coil serves to drive the objective lens 3a radially over the magneto-optical disc.

A sled mechanism 5 is also provided. This facility moves the entire optical head 3 by large amounts in the radial direction of the magneto-optical disc 90.

Information derived from the reflected light captured by the light-receiving unit in the optical head 3 is fed to an RF amplifier 7 for current-to-voltage conversion. The conversion is followed by matrix operation processing whereby a focus error signal FE, a tracking error signal TE, and an RF signal are generated.

The RF signal, i.e., a reproduced signal, is generated as follows: when the magneto-optical disc 90 is exposed to a laser beam at a lower power level than upon recording, a magnetic field vector is detected by use of the magnetic Kerr effect of the reflected light. The magnetic field vector thus detected is used as a basis for generating the RF signal.

The focus error signal FE and tracking error signal TE generated by the RF amplifier 7 are fed to a servo circuit 9 for phase compensation and gain adjustment. Past the servo circuit 9, the signals are sent to the focusing coil and tracking coil of the dual-axis mechanism 4 through a drive amplifier (not shown).

Based on the tracking error signal TE, the servo circuit 9 generates a sled error signal through an LPF (low-pass filter). The sled error signal is supplied to the sled mechanism 5 via a sled drive amplifier (not shown).

The RF signal generated by the RF amplifier 7 is also fed to an EFM/CIRC encoder-decoder 8 for EFM (eight to fourteen modulation) demodulation in binary format and for CIRC (cross interleave Reed-Solomon coding) error correction. The resulting signal is sent to a memory controller 12.

On the magneto-optical disc 90, grooves are furnished beforehand in wobbling fashion at a predetermined frequency (22.05 kHz in this example). Address data are recorded in the grooves by frequency modulation (FM).

The address data are retrieved by an address decoder 10 causing a BPF (band-pass filter) to let only a limited frequency pass through for frequency demodulation. The EFM/CIRC encoder-decoder 8 generates a spindle error signal used in rotating the disc according to a binary EFM signal or based on the address data retrieved by the address decoder 10. The spindle error signal is fed to the spindle motor 2 via the servo circuit 9.

On the basis of the binary EFM signal, the EFM/CIRC encoder-decoder 8 controls a PLL (phase locked loop) settling operation accordingly. The EFM/CIRC encoder-decoder 8 also generates a reproducing clock signal for decoding.

The binary data corrected for error by the memory controller 12 are written to a buffer memory 13 at a transfer rate of 1.4 megabits per second.

When at least a predetermined amount of data is accumulated in the buffer memory 13, the memory controller 12 reads data from the buffer memory 13 at a transfer rate of 0.3 megabits per second, i.e., a rate sufficiently lower than that for write operations. The retrieved data are output as audio data.

Audio data are thus accumulated temporarily in the buffer memory 13 before being output. External disturbances such as vibrations may trigger an irregular track jump leading to an interruption in continuously read data from the optical head 3. In such a case, the time it takes to relocate the optical head 3 to the address where the aberrant track jump occurred is covered by data already held in the buffer memory 13. This facility ensures an uninterrupted audio output.

If the buffer memory 13 is a four-megabyte RAM in this embodiment, a fully-loaded buffer memory 13 contains cumulative audio data lasting about 10 seconds.

The memory controller 12 is in turn controlled by the system controller 11.

The data read from the magneto-optical disc 90 are compressed by a predetermined method (e.g., the acoustic transferred adapted coding method called ATRAC is used by this embodiment) before being written. The data retrieved from the buffer memory 13 by the memory controller 12 move past an audio compression encoder-decompression decoder 14 to become decompressed digital data. The digital data are sent to a D/A converter 15.

The D/A converter 15 converts the decompressed digital data from the audio compression encoder-decompression decoder 14 into an analog audio signal. The analog audio signal is fed to a reproduced output portion (composed of an amplifier, speakers, headphones, etc.), not shown, through an output terminal 16. The reproduced audio output is provided in this manner.

In the reproducing operation above, the system controller 11 performs varieties of control: it transfers servo commands to the servo circuit 9 according to the operations of an operation unit 19; tells the memory controller 12 how to control the buffer memory 13; causes a display unit 20 to display text information such as an elapsed playing time and the title of a program being played; and causes the EFM/CIRC encoder-decoder 8 to execute spindle servo control and decoding control.

In addition to the operation unit 19, a remote commander 50 is provided for the user to perform various operations. Illustratively, the remote commander 50 emits an infrared modulated signal as a command reflecting the user's operation. The command (i.e., operation information) is converted to an electrical signal by an infrared ray receiving unit 23. The electrical signal derived from the conversion is supplied to the system controller 11. The system controller 11 carries out necessary control processing in response to the operation information coming from the infrared ray receiving unit 23.

When recording audio signals such as pieces of music to the disc 90, the MD recorder 1 receives the signals through its input terminal 17 or 21.

Illustratively, an analog audio signal from an analog output terminal of the reproducing apparatus such as a CD player is entered through the input terminal 17. The analog audio signal is converted to a digital signal by an A/D converter 18. From there, the digital signal is sent to the audio compression encoder-decompression decoder 14.

A digital audio signal carrying digital data from a digital output terminal of the reproducing apparatus such as a CD player is entered through the input terminal 21. In this case, a digital interface 25 performs a decoding process and extracts control data with regard to a digital communication format. A digital audio signal extracted by the decoding process is supplied to the audio compression encoder-decompression decoder 14.

With this embodiment, the digital interface 25 complies with the IEEE 1394 interface requirements. Alternatively, a digital interface complying with the above-mentioned IEC 958 requirements may be used. As is well known, the IEEE 1394 interface works as a serial data interface permitting transmission and reception of commands and responses for data transfers between devices and for remote control purposes.

With this embodiment, the IEEE 1394 interface connects the MD recorder/player 1 communicatively to a CD player (reproducing apparatus, to be described later). The hookup permits digital dubbing whereby reproduced audio signals from the CD player are input in digital signal format for unadulterated recording. The interface also provides synchronization of when to start a playback and a recording action in the dubbing process as well as synchronization for high-speed dubbing.

The digital audio signal input to the audio compression encoder-decompression decoder 14 is compressively encoded by ATRAC (acoustic transferred adapted coding). The memory controller 12 sends the compressed digital audio signal at a transfer rate of 0.3 megabits per second to the buffer memory 13 for temporary storage therein.

Upon judging a predetermined amount of compressed data to have been accumulated in the buffer memory 13, the memory controller 12 gives permission to have the data read from the memory 13.

The compressed data retrieved from the buffer memory 13 are submitted to the EFM/CIRC encoder-decoder 8 for such processes as the addition of error correcting codes as per the CIRC scheme and an EFM process. After the processing, the data are supplied to a magnetic head driving circuit 6. Given the data, the magnetic head driving circuit 6 drives accordingly the magnetic head 6a through N-pole or S-pole magnetic field application.

In the recording process involving magnetic field application, the system controller 11 causes the optical head 3 to raise the emission power of a semiconductor laser unit, not shown, to a level higher than that of the reproducing process, whereby the surface of the magneto-optical disc is heated up to the Curie temperature. The heating causes magnetic field information from the magnetic head 6a to be fixed onto the recording surface of the disc. That is, the data are recorded as magnetic field information.

In the recording operation, the system controller 11 also performs varieties of control: it transfers servo commands to the servo circuit 9; tells the memory controller 12 how to control the buffer memory 13; causes the display unit 20 to display information such as an elapsed recording time and the title of a program being recorded; and causes the EFM/CIRC encoder-decoder 8 to execute spindle servo control and encoding control.

In a process involving digital data input, retrieved control data are admitted through the digital interface 25. In a process where analog signal input is involved, an analog audio signal entered through the input terminal 17 is also sent to a mute detection unit 22. The mute detection unit 22 monitors mute gaps between pieces of music borne by the input audio signal. The monitoring information is fed to the system controller 11.

A RAM 24 is a memory that temporarily holds various kinds of information needed by the system controller 11 in carrying out its processes.

A ROM 27 is illustratively constituted by a nonvolatile memory whose data contents may be updated under control of the system controller 11. The ROM 27 retains its contents when power supply is cut off. The ROM 27 contains diverse kinds of programs and data needed by the system controller 11 in effecting various processes.

This embodiment includes a timer unit 28 and an HCMS management table 29 for use in HCMS management. Structures of these components will be described later in connection with the workings of HCMS management. HCMS management is a generic designation representing various types of information management and operation control for implementing the constraints on dubbing according to HCMS provisions.

The timer unit 28 and the HCMS management table 29 may alternatively be implemented by use of some regions in the ROM 27.

The operation unit 19 is provided allowing the user to operate the MD recorder/player 1 as desired. Illustratively, the operation unit 19 has switches, controls, etc., for effecting such basic operations as playback, pause, fast forward, rewind, recording and stop; editing operations such as erasure, connection and division of tracks; and input operations for entering text information such as track and disc names. A command signal reflecting the operation made on the operation unit 19 is transmitted to the system controller 11. In turn, the system controller 11 executes the control process corresponding to the command signal.

With this embodiment, the operation unit 19 of the MD recorder/player 1 may be structured so as to control dubbing of data from a CD player to the MD recorder/player 1, as will be described later.

This embodiment has two modes in which to copy the contents of one CD to a plurality of MDs 90 in the dubbing process mentioned above. One of the two modes is called a track unit recording mode in which the contents of one MD are made distinct from those of the next MD in increments of tracks. The other mode is called a seamless recording mode in which the target contents are recorded in a seamlessly continuous fashion from one MD to another. Either of the two modes may be selected by the user operating the operation unit 19.

In practice, a remote commander with functions equivalent to those of the operation unit 19 may be provided. The remote commander may then be operated to output command signals that may be received in order to prompt relevant processes.

If an analog reproduced audio signal is output from a CD player illustratively to be dubbed by the MD recorder/player 1, with the IEEE 1396 digital interface not used, then a terminal 26 is used to exchange control signals between the CD player and the MD recorder/player 1. The communication via the terminal 26 permits synchronization of when to start and to end a playback of the CD player (to be described later) in the analog dubbing process, synchronization of when to start a recording process of the MD recorder/player 1, as well as synchronization for high-speed dubbing.

3-2. MD Track Format

What follows is a description of a cluster format of recording data tracks on the magneto-optical disc (MD) 90. Data are recorded by a Mini-disc system in units called clusters. A typical format of clusters is shown in FIG. 13.

Figure 13:
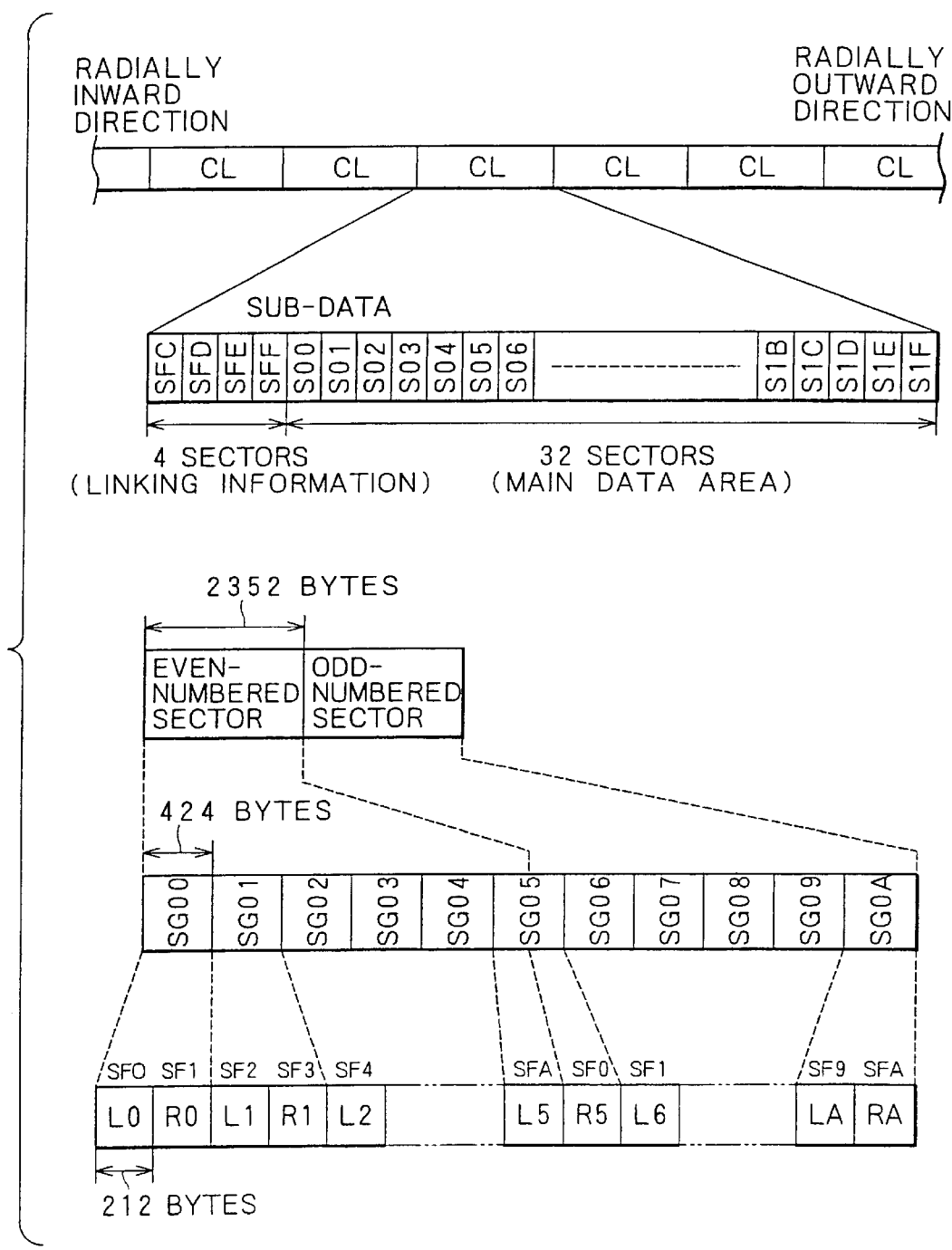
FIG. 13 is a schematic view of a recording format in which to record data onto an MD used as a recordable medium.

As depicted in FIG. 13, clusters CL are formed consecutively as recording tracks on the MD. One cluster is the smallest increment of data to be recorded. Each cluster generally corresponds to two or three tracks.

A cluster CL is constituted by a four-sector sub-data area made of sectors SFC through SFF and by a 32-sector main data area composed of sectors S00 through S1F. For audio-related usage, the main data refer to compressed audio data derived from the ATRAC process described above. A sector is a data unit composed of 2,352 bytes.

The four-sector sub-data area is used to accommodate sub-data and serves as a linking area. TOC (table of contents) data and audio data are recorded to the 32-sector main data area. The sectors in the linking area are dummy sectors justifying a surfeit of the interleaving length based on CIRC (adopted for this embodiment) compared with the sector length (13.3 msec) utilized by CD and other systems for error correction. As such, the linking area is basically a reserved area, although the sectors composing the area may also be used for some processes or for the recording of some control data. An address is recorded to each sector.

Each sector is further divided into smaller units called sound groups. Specifically, two sectors are divided into 11 sound groups.

As illustrated in FIG. 13, a pair of contiguous two even-numbered and odd-numbered sectors (e.g., sector S00 and S01) contain sound groups SG00 through SG0A. Each sound group is constituted by 424 bytes and provides audio data corresponding to a time period of 11.61 msec.

Within each sound group SG, data are recorded on two separate channels: left (L) channel and right (R) channel. Illustratively, the sound group SG00 is composed of L channel data L0 and R channel data R0; the sound group SG01 is made of L channel data L1 and R channel data R1.

A data area accommodating the left or right channel data has 212 bytes that are called a sound frame.

3-3. U-TOC

The surface of the magneto-optical disc (MD) 90 is covered with clusters whose format is shown in FIG. 13. One of radially divided areas on the radially innermost side is set aside as a management area. A program area is located outside the management area.

The management area is made up of a read-only area and an innermost portion of a magneto-optical area. The read-only area located on the radially innermost side accommodates read-only data recorded in phase bits. Located outside the read-only area, the magneto-optical area allows data to be written thereto and read therefrom.

Outside the management area of the magneto-optical area is the program area. In the program area, audio data are recorded to each of the sectors constituting the main data area shown in FIG. 13.

In the management area, the read-only area has a P-TOC (pre-mastered table of contents) for area management regarding the disc as a whole. In the magneto-optical area outside the read-only area, content information (U-TOC or user table of contents) is recorded for management of programs recorded in the program area.

Preparatory to writing or reading data to or from the MD 90, it is necessary to read management information (P-TOC, U-TOC) from the MD. With the management information retrieved, the system controller 11 recognizes addresses designating an area to or from which to write or read data on the disc 90. The retrieved management information is held in the buffer memory 13. The buffer memory 13 has its space divided into two portions: a buffer area for accommodating data being read or written, and an area for holding the management information involved.

When the MD 90 is loaded, the system controller 11 retrieves management information by carrying out a read operation on the radially innermost portion of the disc where the management information is stored. The retrieved management information is held in the buffer memory 13. The information is later referenced upon write and read operations to and from the disc 90.

U-TOC is updated when data are recorded or deleted or after editing work such as text information input is performed. Every time a write, delete or edit operation is carried out, the system controller 11 updates the U-TOC information in the buffer memory 13. Any such update operation is paralleled by the corresponding modification of the U-TOC area on the disc 90 in a suitably timed manner.

Described below are U-TOC sectors accommodating management information used to write or read track data to or from the disc 90. FIG. 14 shows a format of U-TOC sector 0. Sectors 0 through 31 may be allocated as U-TOC sectors. That is, each of the sectors (S00 through S1F) in one cluster of the management area may be used. Sectors 1 and 4 hold text information while sector 2 accommodates recording time-of-day information.

U-TOC sector 0 is a data area that contains management information about pieces of music recorded by the user and about recordable (i.e., free) areas. More specifically, sector 0 accommodates a start and an end address of each of the programs recorded in the program area, copy protect information as a property (track mode) of each program, and emphasis information.

Illustratively, when a piece of music is to be recorded to a disc 90, the system controller 11 searches U-TOC sector 0 for a free area on the disc and writes the audio data to the area thus found out. Upon reading a piece of music from the disc, the system controller searches U-TOC sector 0 for the area where the target piece of music is stored, gains access to that area, and retrieves data from the accessed area.

As shown in FIG. 14, U-TOC sector 0 has a header in which a 12-bit sync pattern is formed, followed by three-byte data representing addresses of the sector in question ("Cluster H," "Cluster L," "SECTOR"), a maker code identifying the relevant disc manufacturer, a model code indicating a disc model, a first program number (First TNO), a last program number (Last TNO), sector usage status ("used sectors"), a disc serial number, and a disc ID.

Also recorded in sector 0 is a corresponding table designating data portion comprising: a pointer P-DFA (pointer for defective area) designating the start position of a slot in which to store information about a defective area on the disc; a pointer P-EMPTY (pointer for empty slot) specifying slot usage status; a pointer P-FRA (pointer for free area) indicating the start position of a recordable area; and pointers P-TNO1, P-TNO2, . . . , P-TNO255 pointing to the start position of each of the slots corresponding to program numbers.

The corresponding table designating data portion is followed by a management table having 255 slots of eight bytes each. Each slot is used to manage a start address, an end address, a track mode, and link information.

With this embodiment, data need not be recorded in a continuous fashion on the magneto-optical disc 90; a sequential data string may be divided into a plurality of discrete parts when recorded. A data part signifies a temporally continuous set of data recorded in physically contiguous clusters.

In the reproducing apparatus in the form of the MD recorder/player 1 in FIG. 11 adapted to the disc 90, data are accumulated temporarily in the buffer memory 13 to absorb different rates at which data are written to and read from the buffer memory 13. The optical head 3 is driven to access successively the data that are recorded in a distributed fashion on the disc 90, with the retrieved data accumulated in the buffer memory 13. The data are restored in the buffer memory 13 back to the original sequential data string for reproduction.

In the above structure, the rate of writing data to the buffer memory 13 for reproduction is higher than the rate of reading data therefrom. This ensures that continuous audio data playback will not be disrupted.

If a program is written over an already recorded program and if the newly written program is shorter than the existing program, the excess portion of the latter is left undeleted and designated instead as a recordable area (managed by pointer P-FRA). This arrangement permits efficient utilization of the recordable capacity.

Figure 15:
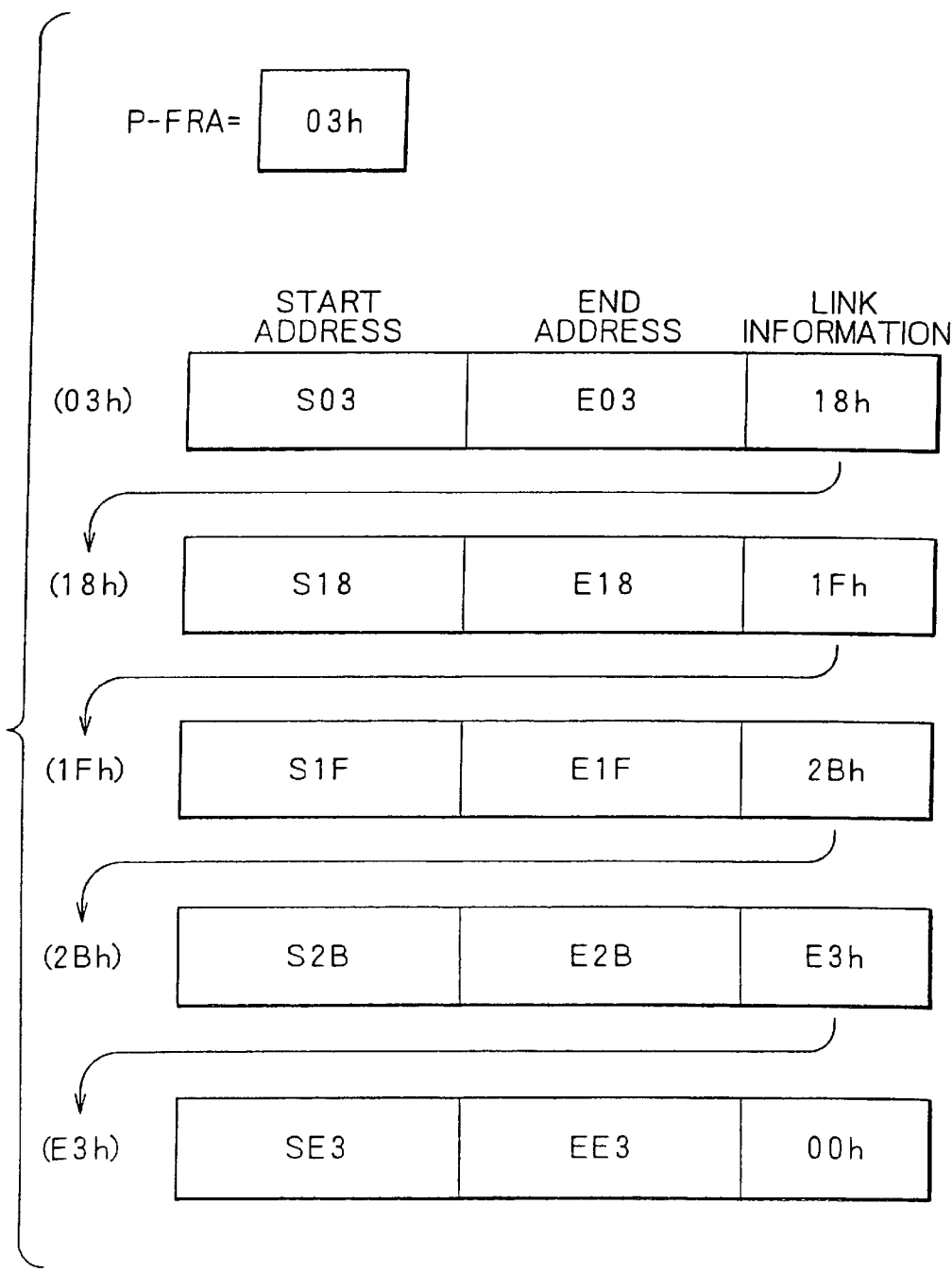
FIG. 15 is a schematic view depicting how discrete recordable areas are linked one another on an MD used as a recording medium.

Described below with reference to FIG. 15 is how dispersed areas are linked by use of the pointer P-FRA for managing recordable areas.

Suppose that a value of 03h (hexadecimal) is recorded to the pointer P-FRA pointing to the start position of a slot for managing a recordable area. In that case, the slot corresponding to the value "03h" is accessed, and data are read from the slot 03h in the management table.

The start and end address data held in the slot 03h designate a start and an end point of one data part recorded on the disc.

Link information held in the slot 03h indicates the address of the slot that follows the slot 03h. In this example, the link information holds a value of 18h.

Link information contained in the slot 18h points to the next slot 2Bh. The slot 2Bh is accessed in order to find a start and an end address designating a start and an end point of another data part recorded on the disc.

The link information is tracked likewise until a value of 00h is encountered. The process makes it possible to acquire the addresses of all data parts managed by means of the pointer P-FRA.

In the manner described, the slots are traced starting from the first slot designated by the pointer P-FRA until the link information becomes null (=00h). This links within memory space the data parts that were separately recorded on the disc. It is thus possible to grasp all data parts as recordable areas on the disc 90.

Whereas the pointer P-FRA was explained above as an example, other pointers P-DFA, P-EMPTY, P-TNO1, P-TNO2, . . . , P-TNO255 may also be used likewise in the management process linking dispersed data parts.

3-4. Structure of CD Player

Figure 16:
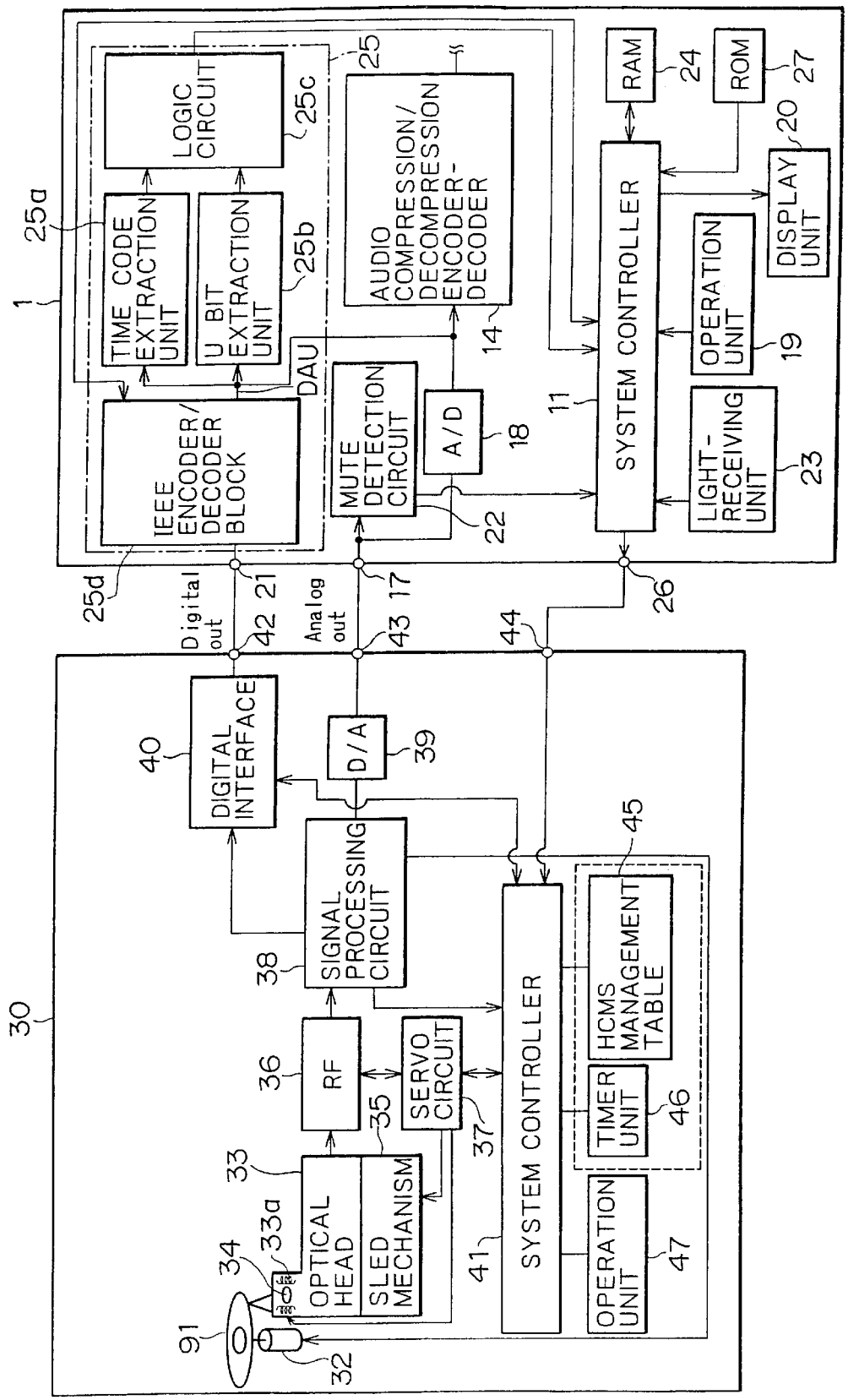
FIG. 16 is a block diagram of a dubbing system applicable to this invention, the system comprising a CD player as a reproducing apparatus and an MD recorder as a recording apparatus.

Described below with reference to FIG. 16 is a typical structure of a CD player 30 acting as the reproducing apparatus in the dubbing system embodying the invention. FIG. 16 shows a partial block of the MD recorder/player 1 in order to clarify its connections to the MD recorder/player 1 in the CD-MD dubbing system. In FIG. 16, the components having the same or corresponding functions as their counterparts in FIG. 11 are designated by like reference numerals, and their descriptions are omitted to avoid unnecessary repetition.

In the dubbing system, audio data reproduced by the CD player 30 are recorded in units of tracks onto the MD 90 in the MD recorder/player 1.

On the CD player 30 serving as the reproducing apparatus, an optical disc (CD or compact disc) 91 is rotated by a spindle motor 32 at a constant linear velocity (CLV).

An optical head 33 comprises an objective lens 33a, a dual-axis mechanism 34, a semiconductor laser unit (not shown), and a light-receiving unit that receives reflected light from the optical disc surface under semiconductor laser emission.

The dual-axis mechanism 34 includes a focusing coil and a tracking coil. The focusing coil acts to drive the objective lens 33a in such a manner that the lens moves close to or away from the optical disc 91. The tracking coil serves to drive the objective lens 33a radially over the optical disc 91.

A sled mechanism 35 is provided to move the entire optical head 33 by large amounts in the radial direction of the optical disc 91.

Information derived from the reflected light captured by the light-receiving unit in the optical head 33 is fed to an RF amplifier 36 for current-to-voltage conversion. The conversion is followed by matrix operation processing whereby a focus error signal FE, a tracking error signal TE, and an RF signal are generated.

The RF signal, i.e., a reproduced signal, is extracted as information indicative of the amount of laser beam emission onto the optical disc 91.

The focus error signal FE and tracking error signal TE generated by the RF amplifier 36 are fed to a servo circuit 37 for phase compensation and gain adjustment. Past the servo circuit 37, the signals are sent to the focusing coil and tracking coil of the dual-axis mechanism 34 through a drive amplifier, not shown.

Based on the tracking error signal TE, the servo circuit 37 generates a sled error signal through an LPF (low-pass filter). The sled error signal is supplied to the sled mechanism 35 via a sled drive amplifier, not shown.

The RF signal generated by the RF amplifier 36 is submitted to a signal processing circuit 38 for binarization, EFM demodulation, and CIRC error correction. The processing yields a digital audio signal as reproduced data.

In accordance with the binary EFM signal, the signal processing circuit 38 generates a spindle error signal for controlling disc revolutions. The spindle error signal thus generated is fed to the spindle motor 32.

On the basis of the binary EFM signal, the signal processing circuit 38 operates a PLL (phase locked loop) circuit to generate a reproducing clock signal. The servo circuit 37 and signal processing circuit 38 are controlled in their operation by a system controller 41.

The digital audio signal from the signal processing circuit 38 is sent to a digital interface 40. Given the signal, the digital interface 40 turns it into digital transmission data complying with a predetermined transmission format supplemented by control and error correcting codes. The digital transmission data thus prepared are output through an output terminal 42. The transmission data enter the MD recorder/player 1 through the input terminal 21 and are supplied to the digital interface 25.

For this embodiment, the digital transmission format obeyed by the digital interfaces 40 and 25 of the CD player 30 and MD recorder/player 1 complies with, but is not limited by, the IEEE 1394 provisions as mentioned earlier.

An IEEE 1394-compatible interface arrangement permits inter-apparatus control signals to be exchanged between the digital interface 40 of the CD player 30 and the digital interface 25 of the MD recorder/player 1. This eliminates the need for a control signal communication setup involving the terminal 44 (on the CD player side) and the terminal 26 (on the MD recorder/player side).

On the other hand, if optical signals are used to carry digital data over an optical communication cable as per digital audio interface requirements, then it is necessary to establish an intercommunication arrangement via the terminals 44 and 26 for control signal communication.

The digital audio signal from the signal processing circuit 38 is branched and fed to a D/A converter 39. The D/A converter 39 converts the input digital audio signal to an analog audio signal that is sent from an output terminal 43 to the input terminal 17 of the MD recorder 1.

An operation unit 47 has various keys (controls) used by the user to control various playback-related operations at least on the CD player 30. The operation unit 47 supplies the system controller 11 with command signals reflecting such key operations.

Depending on the system configuration, the operation unit 47 may include specific keys for controlling the MD recorder/player 1. If any of such keys is operated, the corresponding command signal is transferred under control of the system controller 41 to the system controller 11 of the MD recorder/player 1.

The system controller 11 of the CD player 30 performs control processes involving diverse functional circuits within the player 30 so as to get various playback-related operations executed by the CD player 30. The control processes include those associated with commands coming from the operation unit 47.

As shown enclosed by broken lines, the CD player 30 may have its system controller 11 furnished with a timer unit 46 and an HCMS management table 45. The timer unit 46 and HCMS management table 45 are used for HCMS management purposes and are regarded as functionally identical to the timer unit 28 and HCMS management table 29 attached to the MD recorder/player 1 in FIG. 11.

If the timer unit 28 and HCMS management table 29 of the MD recorder/player 1 are used for HCMS management, as will be described later, then there is no need for the timer unit 46 and HCMS management table 45 allocated to the CD player 30.

If HCMS management is to be conducted on the side of the CD player 30, then the timer unit 46 and HCMS management table 45 are required. In this case, the timer unit 28 and HCMS management table 29 may be omitted from the MD recorder/player 1.

In a dubbing operation, the MD recorder 1 acting as the recording apparatus writes to the MD 90 a digital audio signal or an analog audio signal transmitted from the CD player 30.

The analog audio signal entered through the input terminal 17 is recorded to the disc 90 as follows: the analog audio signal is first converted to a digital audio signal by the A/D converter 18 as described earlier with reference to FIG. 11. The digital audio signal is then input to the audio compression/decompression encoder-decoder 14 for the recording process explained above by referring to FIG. 11.

In the case above, the analog audio signal entered through the input terminal 17 is also supplied to the mute detection unit 22. The unit 22 detects a mute state at the audio level lasting for a predetermined period (e.g., 2 seconds) or longer. A detection signal from the mute detection unit 22 is sent to the system controller 11 as information indicative of program changes (gaps between pieces of music) conveyed by the supplied analog audio signal.

Ordinary CDs contain a mute gap of three to five seconds distinguishing one piece of music from another. Such mute portions are detected and interpreted as program number changes by the mute detection unit 22.

If digital transmission data are fed to the input terminal 21, then the digital interface 25 processes the data. The digital interface 25 complying with the IEEE 1394 interface requirements illustratively comprises an IEEE encoder/decoder block 25_d_, a time code extraction unit 25_a_, a U bit extraction unit 25_b_, and a logic circuit 25_c_, as shown in FIG. 16.

Reproduced digital audio data are transmitted after being encoded by the digital interface 40 of the CD player 30 as per the IEEE 1394 interface provisions. The transmitted data are received by the digital interface 25 of the MD recorder/player 1. Upon arrival at the interface 25, the data are admitted into the IEEE encoder/decoder block 25_d_ for a decoding process whereby digital audio data DAU including sub-codes are extracted. The digital audio data thus obtained are fed to the U bit extraction unit 25_b_ and time code extraction unit 25_a_.

If the received data contain data such as remote control commands other than the digital audio data, then the IEEE encoder/decoder block 25_d_ forwards the commands or the like to the system controller 11.

From the received digital audio signal, the U bit extraction unit 25_b_ extracts U bit data, i.e., flags representing program changes (changes of pieces of music). From the input digital audio signal, the time code extraction unit 25_a_ extracts time code data indicative of an elapsed playing time.

The logic circuit 25_c_ performs a logic operation on the output of the U bit extraction unit 25_b_ and that of the time code extraction unit 25_a_. Given the outputs from the U bit extraction unit 25_b_ and time code extraction unit 25_a_, the logic circuit 25_c_ generates a signal indicating program changes in the digital audio signal from the reproducing side. The generated signal is sent to the system controller 11.

The time code extraction unit 25_a_ extracts an elapsed playing time per program from the transmitted digital data. In generating a program change detection signal, the logic circuit 25_c_ performs a logic operation on two parameters: the elapsed playing time having reached –00 minute and 01 second, and U bit change information.

Alternatively, the program change detection signal may be generated solely on the basis of what is extracted by the U bit extraction unit 25b. As another alternative, the logic circuit may perform a logic operation on U bit change information and on a detected mute gap as in the case of analog recording.

The transmitted digital audio signal is sent from the digital interface 25 to the audio compression/decompression encoder-decoder 14. The encoder-decoder 14 performs the recording process described above with reference to FIG. 11.

The structure of the digital interface 25 shown in FIG. 3 and complying with the IEEE 1394 interface requirements is only an example and may be modified in many ways. For example, an IEEE 1394 interface need not adopt the digital audio interface format described with reference to FIGS. 8A, 8B, 9 and 10. Instead, sub-code information decoded by the transmitting side may be converted to commands as per IEEE 1394 interface provisions for transmission. Upon arrival at the receiving side, the commands may be translated into appropriate processes.

For purpose of explanation, it is assumed here that digital audio data are transmitted through the IEEE 1394 interface using the digital audio interface format shown in FIGS. 8A, 8B, 9 and 10.

The CD-MD dubbing system of this invention described so far permits what is known as standard-speed dubbing, a process in which audio data reproduced by the CD player 30 at standard speed are transferred to the MD recorder/player 1 for standard-speed recording.

The CD-MD dubbing system also provides high-speed dubbing, a process wherein audio data reproduced by the CD player 30 at a speed multiplying the standard speed by a predetermined value are sent to the MD recorder/player 1 for high-speed recording.

In standard-speed dubbing, the CD player 30 rotatively drives the CD 91 at CLV (standard speed) to read data therefrom. The retrieved data are subjected to a reproduced signal process at a processing speed (clock frequency) corresponding to the standard speed. The data thus processed are output illustratively through a digital interface to the MD recorder/player 1. If the retrieved data are to be output in the form of an analog audio signal, the digital audio data are converted to analog format by the D/A converter 39 at a processing speed corresponding to the standard speed before being output.

The MD recorder/player 1 subjects the input signal to signal processes such as compression (including A/D conversion if the data are input as an analog signal) at a processing speed (clock frequency) corresponding to the standard speed. The processed data are written to the buffer memory 13 at a transfer rate of 0.3 megabits per second. Depending on the amount of accumulated data in the buffer memory 13, the data are read therefrom at a transfer rate of 1.4 megabits per second. The read data are written to the MD 90 illustratively one cluster at a time.

In the case of high-speed dubbing, a multiple-fold speed higher than the standard speed is set on the CD player 30. The CD player 30 rotatively drives the CD 91 accordingly to read data therefrom. The retrieved data are submitted to reproduced signal processing at a processing speed corresponding to the established multiple-fold speed. The processed data are output illustratively through a digital interface to the MD recorder/player 1.

The MD recorder/player 1 subjects the input signal to signal processing such as compression (including A/D conversion if the data are input as an analog signal) at a processing speed corresponding to the multiple-fold speed. If the standard speed is multiplied by a factor of N, then data are written to the buffer memory 13 at a transfer rate of $0.3 \times N$ megabits per second. Depending on the amount of accumulated data in the buffer memory 13, the data are read therefrom and written to the MD 90 illustratively one cluster at a time.

At the time of high-speed dubbing, the rate at which data are read from the buffer memory 13 varies with the established multiple-fold speed. That is, if the multiple-fold speed is relatively low, i.e., if the transfer rate of 1.4 megabits per second is sufficiently high compared with the transfer rate of $0.3 \times N$ megabits per second, then the data are read and written to the MD 90 at the rate of 1.4 megabits per second. On the other hand, if the multiple-fold speed is relatively high so that the transfer rate of 1.4 megabits per second is not sufficiently high or is relatively low compared with the transfer rate of $0.3 \times N$ megabits per second, then a higher read rate is set by which to retrieve data from the buffer memory 13, and a rotating speed of the MD 90 corresponding to the new read rate is established.

As described, this embodiment permits two kinds of dubbing: standard speed dubbing, and high-speed dubbing at a predetermined multiple-fold speed.

Control over the dubbing process is effected by the system controllers 41 and 11. The system controller 41 of the CD player 30 variably controls the disc rotating speed of the CD player 30 and the clock frequency set for the reproduced signal processing portion. The system controller 11 of the MD recorder/player 1 variably controls the clock frequency set for the reproduced signal processing portion of the MD recorder/player 1 (and the disc rotating speed if necessary). If the system controllers 11 and 41 are defined so as to permit commands specifying dubbing speeds and their responses to be exchanged therebetween via a digital interface, then it is easy to provide switchover between standard-speed and high-speed dubbing and to implement synchronized reproduction and recording.

This embodiment also permits what is known as seamless recording, a recording process in which data are recorded in an uninterrupted, seamless fashion from one source to a plurality of discs (MDs) by the MD recorder/player 1 utilizing the buffer memory 13 and disc changer facility.

More specifically, when a dubbing operation on a given MD 90 has ended, the reading of data from the buffer memory 13 is temporarily halted. Meanwhile, the process of compressing the audio data signal from the CD player 30 continues, as does the storing of data into the buffer memory 13. The MD 90 with its dubbing finished is housed into the stocker 101, and a new MD 90 is selected and transported from the stocker 101 to the recording and reproducing position. Once the setting of the new MD 90 into the recording and reproducing position is completed, the reading of data from the buffer memory 13 is resumed. This procedure ensures uninterrupted recording of audio data between two consecutively loaded MDs 90 as long as an overflow does not occur in the buffer memory 13.

The above setup provides an automated disc switching operation whereby an MD 90 with its recording finished is housed unattended into the stocker 101 and a new MD on which to record ensuing data is automatically transported therefrom to the recording and reproducing position. Once a plurality of MDs are placed in the stocker 101 preparatory to seamless recording, the recording operation proceeds automatically. There is no need for the user to change discs manually while seamless recording is under way.

In an alternative arrangement for providing seamless recording, the stocker may be replaced by at least a plurality of disc drives in the recording and reproducing unit 102 shown in FIG. 11. In that case, the routing of recording data signals is switched from one disc drive to another so that when recording of data to one disc in one disc drive is finished, another disc in another disc drive is selected to take over the recording. This alternative, although embraced by this invention, is not quite advantageous due to an increased number of component parts and higher costs to provide for partially duplicate portions implementing the recording signal processing. By contrast, the embodiment of the invention permits seamless recording by use of the stocker 101, a single disc drive, and one recording signal processing portion. The reduced number of component parts and the correspondingly lowered costs are a definite advantage. For control over a disc switch, the processing is simple: the reading of data from the buffer memory 13 need only be stopped.

4. Typical Operations Under HCMS Management

As described above, the embodiment of the invention permits high-speed dubbing at a predetermined multiple-fold speed. However, as mentioned in connection with the conventional devices, there is a possibility that the user may infringe on copyrights if high-speed dubbing of the same CD or the same track is allowed to be done more frequently than is reasonably considered normal for personal use.

In view of such circumstances, the CD-MD dubbing system embodying the invention is designed to implement copyright protection by imposing constraints on high-speed dubbing in units of a track in accordance with HCMS provisions. That is, the embodiment implements HCMS management.

The HCMS provisions stipulate that any one track illustratively in the form of a piece of music, once dubbed at a high speed, may not be dubbed again at the high speed at least within 74 minutes of the point in time at which the track in question began to be dubbed. Although the stipulation was mentioned earlier, it is repeated here for emphasis.

Typical operations of the embodiment under HCMS management are described below. How the embodiment typically works under the HCMS is described by referring to the ISRC arrangement of mode 3 shown in FIG. 6C. It is assumed that such HCMS management operations are carried out by use of the timer unit 28 and HCMS management table 29 attached to the MD recorder/player 1.

Audio data reproduced from the CD are sub-coded with Q channel data shown in FIGS. 6A through 6C. Upon high-speed digital dubbing by the CD-MD dubbing system of this embodiment, the Q channel data are transmitted to the MD recorder/player 1 along with the audio data. The MD recorder/player 1 is capable of recognizing contents of the Q channel data.

When high-speed dubbing of a piece of music (track) has started, the MD recorder/player 1 detects a mode 3 ISRC shown in FIG. 6C from the Q channel data obtained at that point.

If an ISRC is detected and if this ISRC does not match any of the ISRCs currently held in the HCMS management table 29, the detected ISRC is written to the table 29 as a track ID. A typical structure of the HCMS management table 29 is illustrated in FIG. 17.

It is assumed that the timer unit 28 comprises a plurality of timers. When a new track ID is set to the HCMS management table 29 as mentioned above, one of unused timers in the timer unit 28 is selectively activated with regard to the newly accommodated track ID. All timers in the timer unit 28 are each set for the maximum count of 74 minutes. Once started, a timer performs a count-down from the 74th minute to zero. Alternatively, the timer may effect a count-up from zero to the 74th minute.

Figure 17:
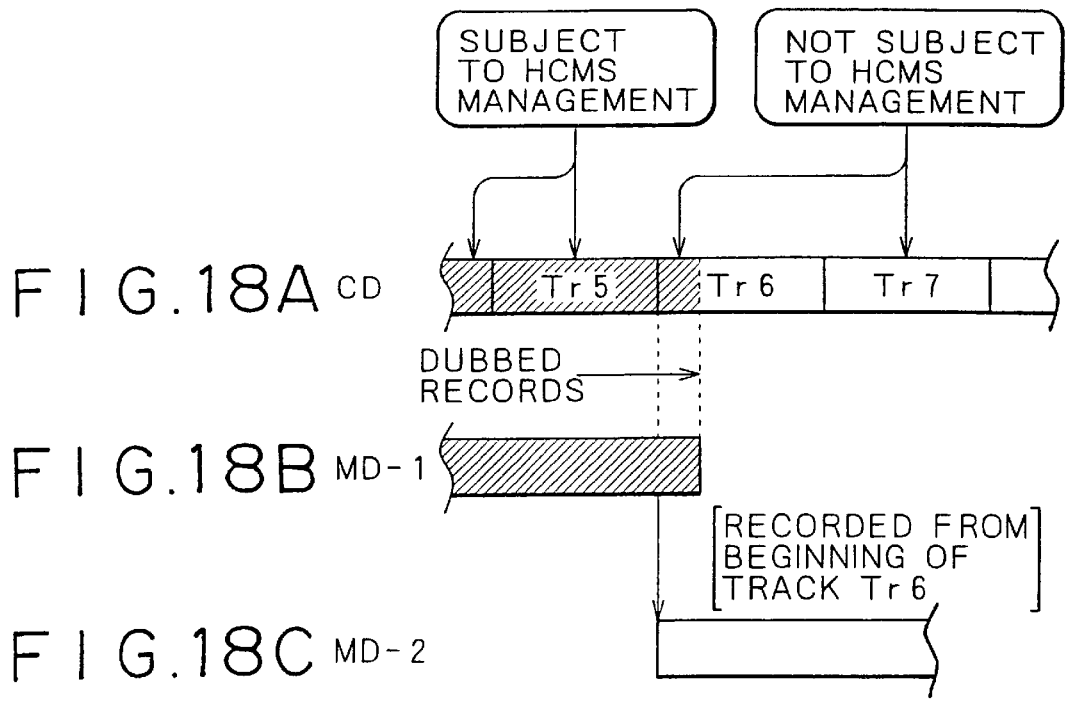
FIG. 17 is a view of an HCMS management table applicable to this invention.

The HCMS management table 29, as shown in FIG. 17, maintains a one-to-one correspondence between each newly written track ID and a timer ID identifying the timer started in relation to each new track ID.

The HCMS management table 29 has as many storage regions (No. 1 through No. n) as the number of timers configured in the timer unit 28, each storage region holding a correspondence between a track ID and a timer ID.

When the 74-minute count has elapsed on the timer corresponding to the track ID written to the HCMS management table 29, the track ID and the corresponding timer ID are erased from the HCMS management table 29. That is, the relevant track and timer information is cleared. This is how the HCMS management table 29 is structured for this embodiment.

Suppose that upon high-speed dubbing of a track, the HCMS management table 29 is found to contain the same track ID, i.e., ISRC detected by the MD recorder/player 1. In that case, the MD recorder/player 1 stops the high-speed dubbing of the track in question. That is, the recording of the track having the same ISRC as that of the track ID held in the HCMS management table 29 is suppressed.

When reproduction of a track is started by the CD player for high-speed dubbing, it takes a very short time for the MD recorder/player 1 to detect an ISRC. If it is assumed that at least one ISRC (Q channel data in mode 3) occurs unfailingly every 100 sub-coding blocks, with 75 sub-coding blocks approximately corresponding to one second at standard speed, then the ISRC in question is detected substantially within one second at high speed; such a time period for code detection has only minor variations contingent on the actual high speed setting in effect.

When the full count on a timer has expired, the corresponding track ID is cleared from the HCMS management table 29. Once the timer count has elapsed, recording of the track having the same ISRC as that of the track ID in question can be resumed for high-speed dubbing.

This embodiment, as described, prevents any track dubbed at high speed from being recorded in another, session of high-speed dubbing for the period set on the corresponding timer (e.g., 74 minutes). Attempts at high-speed dubbing of the track by the MD recorder/player 1 are rejected the moment the applicable ISRC is detected. Because any one track recorded previously at high speed cannot be dubbed again at high speed within the time period set on the corresponding timer, the same track cannot be copied frequently in a limited period of time, whereby possible infringement on copyrights is prevented.

As mentioned above, it takes about one second to detect an ISRC from the audio data reproduced from the CD. That means there is a possibility that a small amount of track data may be recorded before the MD recorder/player 1 stops its recording operation by recognizing the injunction against high-speed dubbing. In such a case, the U-TOC may be updated so as to erase the inadvertently recorded data. This arrangement is preferable because the unnecessarily recorded data from the user's point of view are automatically deleted.

In the above example of HCMS management, ISRCs are utilized as track IDs. Alternatively, information other than the ISRC may be employed for HCMS management.

Here is an alternative example: information constituting the TOC of any given CD is specific to that CD. Of such information, track numbers identifying tracks and playback times are unique to the tracks. From such TOC information, it is possible to generate track IDs for identifying the tracks on the CD. The track IDs thus generated may also be used for HCMS management in about the same manner as described above.

Where track IDs are thus generated alternatively on the basis of the TOC of the CD, there may be provided illustratively a setup whereby the track ID of the next track to be reproduced upon track change is transferred from the CD player 30 to the MD recorder/player 1.

Unlike in the case where ISRCs are used as track IDs, the alternative setup above eliminates the need for the MD recorder/player 1 to detect data for use as track IDs from the reproduced data from the CD. Before reproduction of the next track is started, the CD player 30 can then determine whether or not to inhibit high-speed dubbing.

In the examples above, HCMS management was shown implemented in units of tracks. In a less complicated arrangement, HCMS management may be accomplished in units of an entire medium bearing a copy source such as a CD.

Illustratively, as mentioned above, the TOC contents on a CD may be regarded as unique to that CD. Based on that TOC information, a disc ID identifying the CD as a whole may be generated. In place of the track IDs discussed above, this disc ID may be utilized for HCMS management.

Every time a high-speed dubbing session is carried out, the HCMS management table 29 accommodates a disc ID identifying the recording source in place of a track ID, as shown in parentheses in FIG. 17. At the same time, the disc ID is matched with a timer ID set to the HCMS management table 29. Thus starts the timer in the timer unit 28 which is designated by the timer ID.

If an attempt is made to submit a CD to high-speed dubbing, the disc ID generated from the TOC of that CD is compared with the disc IDs held in the HCMS management table 29. If a matching disc ID is found in the table, high-speed dubbing of the CD is inhibited. If no disc ID is found matched in the HCMS management table 29, then high-speed dubbing of the CD is allowed to proceed.

When HCMS management is implemented in units of a disc as described, there can be some disadvantage. For example, even if a track Tr1 alone of a CD has been recorded at high speed, the entire CD ranging from the track Tr1 to the last track is inhibited from high-speed dubbing for 74 minutes starting from the time the track Tr1 began to be recorded at high speed.

As mentioned earlier, the CD-MD dubbing system of this invention may have a timer unit 46 and an HCMS management table 45 attached to the CD player 30. The attachments allow HCMS management to be carried out on the side of the CD player 30. With the CD player 30 in charge of HCMS management, illustratively any requests for reproducing tracks banned from high-speed dubbing are canceled by the CD player.

For copyright protection by this embodiment, the timer time (i.e., time period in which high-speed dubbing is inhibited) is not limited to 74 minutes if HCMS requirements need not be obeyed. The timer time may be set for a longer or a shorter period in view of the actual use conditions and the effectiveness for copyright protection. For example, on the assumption that the playing time of one track is about 3 minutes on average, the timer time per track may be set for three minutes.

5. High-speed Dubbing by the Embodiment 5-1. Basic Concept of Dubbing by the Embodiment The CD-MD dubbing system of this embodiment has the disc changer function that is included in the CD recorder/player 1. The function allows the contents of one CD to be dubbed automatically to a plurality of MDs. More specifically, when the currently loaded MD has its recordable capacity exhausted halfway during the recording of reproduced data from a CD, that MD is automatically replaced by another MD to which the remaining CD data start being recorded. This type of recording operation may be referred to as inter-disc recording in the description that follows.

If inter-disc recording is conducted at high speed simply in compliance with the HCMS provisions, the last track partially recorded to the first MD (MD-1) is barred from being recorded consecutively to the next MD (MD-2), as discussed in connection with the prior art with reference to FIGS. 2A through 2C and 3A through 3C.

Such inconveniences are averted by the embodiment that adopts a setup explained conceptually below with reference to FIGS. 18A through 18C. FIGS. 18A and 18B show a dubbing operation similar to that in FIGS. 2A and 2B. Specifically, part of a track Tr6 has been recorded last to MD-1 before the capacity of the MD is exhausted.

In that case, the embodiment excludes the partially recorded track Tr6 from HCMS management as shown in the upper part of FIG. 18A. That is, the track Tr6 is handled as a track yet to be subjected to high-speed dubbing like a track Tr7, for example. This makes it possible for the track Tr6 to be recorded at high speed again from the beginning to the next MD-2 as depicted in FIG. 18C.

This embodiment is structured specifically to permit inter-disc recording at high speed on the basis of the above concept, as will be described in more detail below.

5-2. Track Unit Recording Mode and Seamless Recording Mode

The embodiment of the invention has two operation modes of inter-disc recording: track unit recording mode and seamless recording mode.

The track unit recording mode is a mode in which the currently loaded MD is arranged to record, within its recordable capacity, data in increments of tracks each in its entirety. The next MD is arranged likewise to record data in units of tracks each in its entirety, and so on.

FIGS. 19A through 19C show an example of recording in the track unit recording mode. FIG. 19A indicates part of a CD being subject to reproduction. FIG. 19B illustrates a recording operation on the first MD (MD-1), and FIG. 19C depicts a recording operation on the next MD (MD-2).

FIG. 19B shows that MD-1 has accommodated data of up to a track Tr5 before its recordable capacity is exhausted. In other words, the remaining recordable capacity of MD-1 is not sufficient for storing the next track Tr6 in its entirety.

In such a case, with the track unit recording mode in effect, the recording of data to MD-1 is temporarily halted the moment the track Tr5 is fully stored onto MD-1. The currently loaded disc MD-1 is then replaced by the next disc MD-2 that is loaded into the recording and reproducing position. Recording of the track Tr6 to MD-2 is started thereafter, as shown in FIG. 19C.

Such recording in the track unit recording mode is based on the concept explained illustratively above with reference to FIGS. 18A through 18C. Unlike the case in FIGS. 18A through 18C, the setup of FIGS. 19A through 19C acquires in advance the number of tracks that may be entirely accommodated by the recordable capacity of the currently loaded MD. Any tracks that are known to exceed the capacity of the MD as shown in FIG. 19B are not subject to recording. When the next MD is loaded and put into use, the tracks barred previously from recording start being recorded from the beginning on the new MD.

High-speed dubbing could be performed according to the concept illustrated in FIGS. 18A through 18C. In that case, however, MD-1 would be obliged partially to accommodate the track Tr6 that is already known to exceed the recordable capacity of the currently loaded MD. The partial recording of the track Tr6 is superfluous and unnecessary.

By contrast, the dubbing session in the track unit recording mode shown in FIGS. 19A through 19C excludes the unnecessary recording operation above and shortens the dubbing time correspondingly. Furthermore, the track unit recording mode eliminates the need for the user subsequently to erase the superfluous track such as the track Tr6 from MD-1, as in the case of FIG. 3B.

In the seamless recording mode, inter-disc recording is carried out in a seamless manner as described earlier. An example of recording in the seamless recording mode is shown in FIGS. 20A through 20C. FIG. 20A indicates part of a CD being subject to reproduction. FIG. 20B illustrates a recording operation on the first MD (MD-1), and FIG. 20C depicts a recording operation on the next MD (MD-2).

In the seamless recording mode, as shown in FIG. 20B, MD-1 accommodates reproduced CD data until its recordable capacity is completely exhausted. In this case, it is assumed that data up to a divided data position Pdv midway into the track Tr6 have been recorded.

When its recording is finished, MD-1 is replaced by MD-2 to which the data immediately following the divided data position Pdv in the track Tr6 start being recorded. Between MD-1 and MD-2, the track Tr6 is recorded in a "seamless" fashion with no data omitted.

As discussed in connection with the prior art with reference to FIGS. 3A through 3C, if high-speed dubbing were performed in the seamless recording mode as per the HCMS requirements, it would be impossible to resume high-speed dubbing of the track Tr6 on MD-2 where it was suspended on MD-1 because the track Tr6 is subject to HCMS management since the recording of the track to MD-1 began.

When the embodiment is set to perform high-speed dubbing in the seamless recording mode, the last track partially recorded onto the first MD is regarded as not applicable to HCMS management. That is, the basic concept illustrated in FIGS. 18A through 18C is applied to this embodiment.

The arrangement above makes it possible to submit the rest of the partially recorded track at the end of one MD to high-speed dubbing onto the next MD. In that case, there is no problem for high-speed dubbing to proceed in the seamless recording mode depicted in FIGS. 20A through 20C.

It should be noted again that in the examples shown in FIGS. 19A through 19C and 20A through 20C, the tracks including the track Tr5 already recorded at high speed are subject to HCMS management and cannot be dubbed again for at least 74 minutes starting from the time the high-speed dubbing began. However, standard-speed dubbing is normally performed if desired.

5-3. Processing in Track Unit Recording Mode

What follows is a description of processes for high-speed dubbing in each of the track unit recording mode and the seamless recording mode. As described above, switchover between the track unit recording mode and the seamless recording mode may be accomplished beforehand manually by the user.

How high-speed dubbing is carried out in the track unit recording mode is described below with reference to FIGS. 21 and 22. The steps shown in these figures are performed by the system controller 11 of the MD recorder/player 1.

Figure 21:
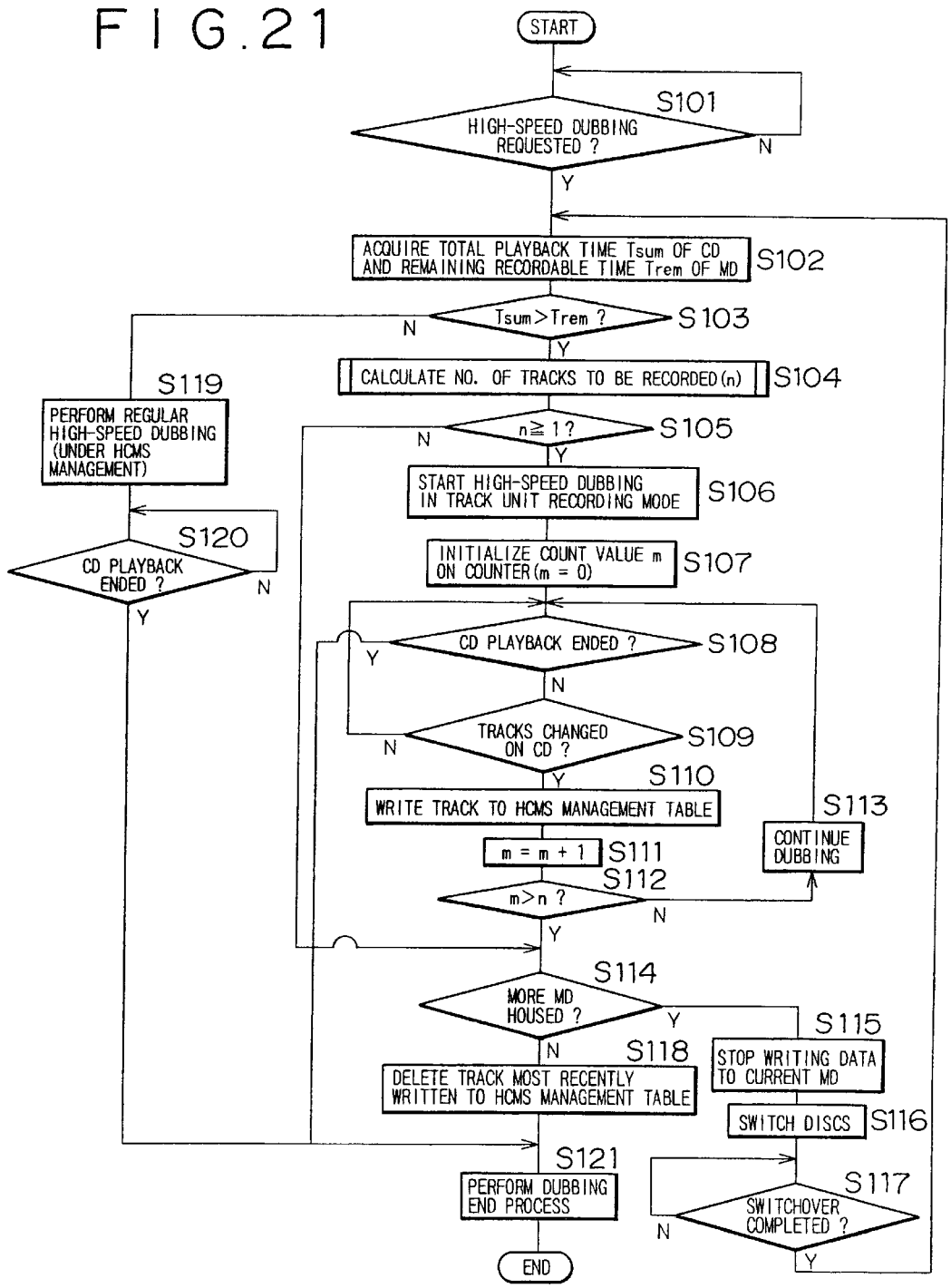
FIG. 21 is a flowchart of steps constituting a control routine for use in a track unit recording mode.

Illustratively, with the track unit recording mode in effect, the system controller 11 goes to step S101 in FIG. 21 to wait for a request for high-speed dubbing to arrive. That request is issued in response to the user's operation on the operation unit for high-speed dubbing. When a high-speed dubbing requested is acquired, step S102 is reached.

Step S102 is carried out to acquire a total playback time Tsum of the currently loaded CD for high-speed dubbing and a remaining recordable time Trem of the MD currently in the recording and reproducing position.

The total playback time Tsum of the CD is a sum of playback times of the tracks to be dubbed from the CD. For example, if all tracks are reproduced for dubbing in ascending order of their track numbers starting from the first track Tr1, that means the target tracks to be dubbed range from the track Tr1 to the last track. The playback times of these tracks amount to the total playback time Tsum of the CD. If tracks are reproduced in ascending order of their track numbers from the second track Tr2 on, that means the total playback time Tsum of the CD is a sum of the playback times of the track Tr2 through the last track. The user may alternatively choose a program mode in which tracks to be reproduced are selected along with a sequence in which to reproduce the selected tracks. In that case, the playback times of the selected tracks amount to the total playback time Tsum of the CD. In short, the process in step S102 calculates in temporal terms the total .data capacity of the target tracks to be reproduced for dubbing purposes.

The total playback time Tsum of a given CD is obtained as follows: illustratively, the system controller 41 of the CD player 30 computes and retains the total playback time Tsum of the currently loaded CD 91 based on TOC information read from the disc. By communicating with the system controller 41, the system controller 11 of the MD recorder/player 1 acquires the information representative of the total playback time Tsum of the CD and writes the acquired information illustratively to the RAM 24.

The remaining recordable time Trem of an MD 90 is a temporal expression of the recordable capacity of that MD. The remaining recordable time Trem of a given MD is calculated as follows: the quantity of free area data (i.e., number of sectors) is first obtained from the recorded contents of U-TOC sector 0 on the MD in question. The data amount thus acquired is then translated into a recordable time.

To obtain the remaining recordable time Trem of an MD requires reading a TOC from that MD and storing the retrieved TOC in memory. In an actual inter-disc recording session, a TOC may be retrieved every time an MD 90 is loaded into the recording and reproducing position. Alternatively, at power-on preparatory to inter-disc recording, TOCs may be read from all MDs 90 that are loaded into the stocker 101.

In step S103, a comparison is made between the total playback time Tsum of the CD and the remaining recordable time Trem of the MD. Specifically, a check is made to see if the relation "Tsum>Trem" holds.

If the result of the check in step S103 is negative, that means the remaining recordable time Trem of the MD is longer than the total playback time Tsum of the CD. In other words, the currently loaded MD 90 is capable of accommodating all target tracks reproduced from the CD 91 for dubbing purposes; there is no need for inter-disc recording to be carried out.

In that case, step S103 is followed by step S119 in which regular high-speed dubbing excluding inter-disc recording is started. Carrying out step S119 causes high-speed dubbing to proceed under HCMS management as described above. The high-speed dubbing process following step S119 continues until reproduction of tracks from the CD is judged to have ended in step S120.

When track reproduction from the CD is found terminated in step S120, step S121 is reached. In step S121, a dubbing end process is carried out. More specifically, the writing of target data to the buffer memory 13 is brought to an end, followed by termination of the data write operation. The TOC may be updated if necessary, before the controller exits from this routine.

If the result of the check in step S103 is affirmative, then step S104 is reached. An affirmative result of the check in step S103 signifies that the remaining recordable time Trem of the MD is shorter than the total playback time Tsum of the CD. That is, accommodating all target tracks to be dubbed requires resorting to inter-disc recording. Step S104 and subsequent steps constitute processes for executing inter-disc recording in the track unit recording mode.

Step S104 is carried out to compute the number of target tracks to be recorded (n), i.e., information needed to conduct inter-disc recording in the track unit recording mode. The number of target tracks to be recorded means the number of tracks that can be fully accommodated by the recordable capacity of the currently loaded MD 90.

More detailed processes making up step S104 are shown in FIG. 22. In FIG. 22, step S201 is first carried out to initialize the parameters representing the total playback time Tsum of the CD and the number of target tracks to be recorded (n). Specifically, the settings "Tsum=0" and "n=0" are initially established.

Step S202 is carried out next to obtain the playback time Ts of the (n+1)th track in playback order among the tracks to be reproduced from the CD 91. Illustratively, if step S202 is performed for the first time, that means n+1=1, and the playback time Ts of the first track to be reproduced is acquired.

In step S203, the playback time Ts thus obtained is added to the current total playback time Tsum of the CD. That is, an operation "Tsum=Tsum+Ts" is carried out to update the total playback time Tsum of the CD. If step S203 is carried out for the first time, then Tsum=Ts.

In step S204, a check is made to see if the relation "Tsum>Trem" holds, where Tsum stands for the total playback time of the CD updated in step S203, and Trem denotes the remaining recordable time of the MD obtained in step S102.

If the result of the check in step S204 is negative, i.e., if the updated total playback time of the CD is judged to be no greater than the remaining recordable time Trem of the MD, step S205 is reached. In step S205 the variable number of target tracks to be recorded (n) is incremented by one, before step S202 is reached again.

As long as the check in step S204 yields a negative result, steps S202 through S205 are repeated, whereby the total playback time Tsum of the CD is acquired as a sum of the playback times Ts of the target tracks to be dubbed.

Eventually the check in step S204 yields an affirmative result. That means the reproduced tracks up to the (n+1)th track are judged to be fully recordable onto the currently loaded MD. The system controller 11 then goes to step S206. In step S206, the variable number of target tracks to be recorded (n) is established definitively as the number of target tracks to be recorded (n). The number thus acquired serves as the result of the process in step S104.

Returning now to FIG. 21, the system controller 11 goes to step S105 from step S104 in which the number of target tracks (n) was computed. In step S105, a check is made to see if the number of target tracks (n) is at least one.

If the number of target tracks to be recorded (n) is not judged to be at least one, i.e., if the number of target tracks is found to be zero, then step S114 (described later) is reached. The number of target tracks (n) being zero signifies that the recordable capacity of the MD 90 currently in the recording and reproducing position is now incapable of accommodating in its entirety any further track to be reproduced from the CD.

On the other hand, if the number of target tracks to be recorded (n) is judged to be at least one, step S106 is reached. In this case, at least one more track can be accommodated within the recordable capacity of the MD 90 currently in the recording and reproducing position.

In step S106, high-speed dubbing in the track unit recording mode is started. While high-speed dubbing is under way in the track unit recording mode, step S107 is carried out to initialize illustratively a general purpose counter (with a count value "m"=0) inside the system controller 11. The count value "m" represents the number of tracks to be reproduced from now on from the CD.

In step S108, a check is made to see if reproduction of data from the CD has ended. If the result of the check in step S108 is affirmative, then step S121 is reached for the dubbing end process. If the check in step S108 yields a negative result, i.e., if data reproduction from the CD is still under way, step S109 is reached.

In step S109, a check is made to see if a track change has occurred during CD data reproduction. If step S109 is reached for the first time, the starting of playback of the first track is recognized as a track change.

The presence or absence of track changes is judged illustratively through detection of sub-codes or mute gaps in the reproduced CD data as mentioned above. Control is returned to step S108 as long as no track change takes place. Once a track change is recognized, step S110 is reached.

Step S110 is carried out to write to the HCMS management table 29 an entry of the track whose data are to start getting dubbed onto the MD 90 following the track change. The track entry process is performed as described earlier with reference to FIG. 17. In this example, an entry of the track is made to the HCMS management table 29 in properly timed relation with the start of track dubbing to the MD 90.

In step S111, the count value "m" is incremented by one. In step S112, a check is made to see if a relation "m>n" holds, where "m" denotes the count value currently in effect and "n" represents the number of target tracks to be recorded as calculated in step S104.

If the result of the check in step S112 is negative, that means there still remains a track to be accommodated in its entirely onto the MD. In that case, the dubbing is allowed to continue as designated in step S113, and step S108 is reached again.

When steps S108 through S113 are repeated; the tracks reproduced consecutively from the CD are, recorded to the MD. Each track to be dubbed is subjected to HCMS management in property timed relation to the start of its recording.

Suppose that as many tracks as the number of target tracks to be recorded (n) have been reproduced and that there has been a track change to a first track to be recorded onto the next MD. In that case, the first track destined for recording onto the next MD is arranged to be submitted to HCMS management in step S110. In step Sill, the count value "m" is incremented by one. This brings about an affirmative result of the check in step S112.

Given an affirmative result of the check in step S112, the system controller 11 reaches step S114 to determine whether another MD is housed in the stocker 101. The system controller 11 is designed to have the ability to recognize the MD storage status in the stocker 101. If an empty disc that has yet to undergo inter-disc recording is judged to exist, then step S115 is reached.

In step S115, the data write operation is stopped upon completion of the writing of data up to the end position of the last track on the currently loaded MD. In step S116, the current MD is replaced by the next MD that is loaded into the recording and reproducing position. In other words, a disc changeover is carried out.

At this point, reproduction of data may already have been started from the next track of the CD. Since the reproduced data are accumulated temporarily in the buffer memory 13, the reproduced data from the next track will not be lost as long as there is no overflow in the buffer memory 13.

In step S117, a check is made to see if the disc changeover has been completed. When the disc changeover is judged to have ended, step S102 is reached again.

When control is returned to step S102 following steps S115 through S117, step S102 is carried out again to acquire the total playback time Tsum of the CD and the remaining recordable time Trem of the MD. That is, the total playback time Tsum of the CD is obtained as representative of all remaining tracks. The remaining recordable time Trem is computed with regard to the MD 90 that was loaded anew into the recording and reproducing position in step S116 earlier.

After control is passed on from step S114 back to step S102 via steps S115 through S117, step S102 and subsequent steps are again carried out to effect inter-disc recording as high-speed dubbing in the track unit recording mode, as long as the stocker 101 contains an MD 90 with a sufficient recordable capacity to accommodate at least one track in its entirety.

If no more MD is found available in the stocker 101 even though there remains a track to be reproduced from the CD, the result of the check in step S114 is negative. In that case, step S118 is reached.

Earlier, step S110 was carried out to submit a target track to HCMS management in a suitably timed relation to a track change on the CD. When the check in step S114 reveals the unavailability of subsequent inter-disc recording, a putative failure to exclude the target track from HCMS management in the most-recently reached step S110 will disable high-speed dubbing of the track in question for the next 74 minutes despite the fact that no part of the track is recorded yet to a new MD at high speed.

It is thus obvious that a negative result of the check in step S114 requires carrying out step S118 to clear from the HCMS management table 29 the target track entered there in the most-recently reached step S110. Step S118 is followed by step S121 for the dubbing end process.

5-4. Processing in Seamless Recording Mode

How high-speed dubbing is carried out in the seamless recording mode is described below with reference to FIG. 23. The steps shown in the figure are also performed by the system controller 11 of the MD recorder/player 1.

The system controller 11 first goes to step S301 to wait for a request for high-speed dubbing, to arrive. When a high-speed dubbing requested is acquired, step S302 is reached.

As in step S102 of FIG. 21, step S302 is carried out to acquire a total playback time Tsum of the currently loaded CD and a remaining recordable time Trem of the current MD. In step S303, as in step S103 of FIG. 21, a comparison is made between the total playback time Tsum of the CD and the remaining recordable time Trem of the MD. That is, a check is made to see if the relation "Tsum>Trem" holds.

If the result of the check in step S303 is negative, step S317 is reached. Step S317 and the next step S318 are functionally identical to steps S119 and S120 in FIG. 21 for executing regular high-speed dubbing without inter-disc recording, and no further description of the two steps will be given here. If completion of data reproduction from the CD is detected in step S318, step S319 is reached for a dubbing end process, and the system controller 11 exits from this routine. The dubbing end process in step S319 may be the same as that in step S121.

In the case of an affirmative result of the check in step S303, step S304 is reached wherein high-speed dubbing in the seamless recording mode is initiated. In other words, for subsequent inter-disc recording from one MD to another, the data to be dubbed are arranged to remain continuous with no data drop-out.

After high-speed dubbing has been started as described, a check is made in step S305 to see if data reproduction from the CD has ended. If CD data reproduction is judged to have ended in step S305, step S319 is reached for the dubbing end process. If the result of the check in step S305 is negative, with the data reproduction from the CD continued, then step S306 is reached.

In step S306, a check is made to see if a track change has occurred during CD data reproduction. If step S306 is reached for the first time, the starting of playback of the first track is recognized as a track change as in the preceding example.

If no track change is detected in step S306, step S307 is reached. In the seamless recording mode, the writing of reproduced data is continued until the recordable capacity of the MD has become null (zero). A check in step S307 determines whether the remaining recordable time Trem of the MD has reached zero. In other words, whether or not the recordable capacity of the MD has been completely exhausted is verified.

If the check in step S307 shows that the remaining recordable time of the MD is other than zero, i.e., that the MD still has a recordable capacity, then step S309 is reached in which continuation of the dubbing operation is decided on. Step S309 is followed by step S305. If the remaining recordable time of the MD is judged to be zero, with no further data allowed to be written to the MD, then step S310 and subsequent steps are reached and carried out.

If a track change is detected in step S306, then step S308 is reached. In step S308, the track to be dubbed from now on to the new MD 90 following the track change is entered into the HCMS management table 29. Step S308 is followed by step S309 which in turn is followed by step S305.

If in step S307 the recordable capacity of the MD is judged to be exhausted, the system controller 11 goes to step S310.

In step S310, as in step S114 of FIG. 21, a check is made to see if anther MD is housed in the stocker 101. If the result of the check in step S310 is affirmative, steps S311 through S313 are carried out before step S302 is reached again.

Steps S311 through S313 are functionally identical to steps S115 through S117 in FIG. 21. When step S302 is reached following steps S311 through S313, the same process as that of step S102 in FIG. 21 is performed. That is, step S302 is carried out again to acquire the total playback time Tsum of the CD and the remaining recordable time Trem of the MD 90. The total playback time Tsum of the CD is representative of all remaining tracks, and the remaining recordable time Trem is computed with regard to the MD 90 that has been newly loaded into the recording and reproducing position.

By the processes above, the last track partially recorded onto the earlier MD 90 at high speed is recorded in a seamless manner on to the next MD 90 also at high speed, i.e., the track in question is exempt from HCMS management until it is recorded in its entirety. One track can thus be dubbed continuously onto a plurality of MDs at high speed.

Step S308, in which the track to be recorded is entered into the HCMS management table, is carried out in keeping with a track change on the CD, i.e., in properly timed relation to the start of high-speed dubbing of the track in question. That means the timer for HCMS management starts its counting in a suitably timed manner as the high-speed dubbing begins. In other words, the timer for HCMS management performs its counting appropriately on any one track that is dubbed at high speed seamlessly onto a plurality of MDs.

If no other MD is judged to be housed in the stocker 101, i.e., if the result of the check in step S310 is negative, then step S314 and subsequent steps are reached. The dubbing end process is initiated in step S314 and continues on to steps S315 and S316.

When the result of the check in step S310 is negative and the dubbing is brought to an end accordingly, the last track written to the currently loaded MD is terminated in an incompletely recorded state. Without suitable arrangements, the track in question would now be subject to HCMS management following the process in the most-recently executed step S308. However, it is difficult to convince the user that a partially dubbed track is also subject to HCMS management; the incompletely recorded track should be allowed to be dubbed again at high speed before the 74-minute injunction against high-speed dubbing expires. By execution of step S315, this embodiment erases the entry of the most recently-and partially-dubbed track from the HCMS management table 29.

When step S316 is carried out next, the most recently recorded track is deleted from the MD in question.

Where the result of the check in step S310 is negative, there may be a case in which the last track was recorded continuously to a plurality of MDs (with their recordable capacities assumed to be sufficiently small) but has failed to be accommodated thereby in its entirety. In that case, the TOCs of all MDs involved are updated in such a manner that the last-recorded track is deleted from the MDs. This process spares the user of the chores of having to erase manually the incompletely recorded last track from the MDs.

The description so far has been made on the assumption that only high-speed dubbing is subject to injunctions against unbridled recording. However, in view of possible future trends toward more rigorous protection of copyrights, or simply for better copyright protection regardless of the current HCMS requirements, it is legitimate and even desirable to envisage measures for restricting standard-speed dubbing in a qualified manner.

For example, there may be provided a copy management system obeying the rule: "Irrespective of the dubbing speed, any one track or piece of music once dubbed is inhibited from another session of dubbing for at least 74 minutes starting from the time the track in question began to be dubbed."

The structure of the embodiment discussed above may be readily modified to embrace that alternative copy management system. Illustratively, a copy management system subject to restrictions on standard-speed dubbing is implemented by simply altering the arrangements of the embodiment explained with reference to FIGS. 18A through 23.

While this invention has been described in conjunction with a specific embodiment and related examples, the invention is not limited to such specificities. For example, whereas the above-described dubbing system of the invention was shown interconnecting an MD recorder/player and a CD player, the invention may also apply to a dubbing system involving a plurality of MD recorder/players, as well as to a dubbing system dealing with DATs, tape cassettes or other tape media for recording and reproduction.

The record sources to be dubbed are not limited to audio data reproduced from media as long as the sources are properly managed by a copy management system. What may be adopted as a source today and in future includes audio data received by terrestrial radio tuners and satellite digital broadcast tuners.

As described and according to the invention, programs (tracks) recorded to a dubbing destination storage medium (MD) at high speed or standard speed are inhibited from another session of such high-speed or standard-speed dubbing for a predetermined period of time. Any program that is recorded only partially to the dubbing destination storage medium is excluded from the scope of a qualified injunction against high-speed or standard-speed dubbing.

The inventive scheme allows the user to record onto a newly-loaded storage medium any such program that was partially recorded to the previously-loaded medium, without a forced interval between the two dubbing sessions. That is, with the requirements for copyright protection duly met, the dubbing apparatus of the invention allows the user to record a desired source to two storage media in a practically consecutive manner. The invention thus enhances the ease of use and availability of the dubbing apparatus.

What is claimed is:

1. A dubbing apparatus for dubbing, at a predetermined speed higher than a standard dubbing speed, programs reproduced from a first storage medium serving as a dubbing source onto a second storage medium acting as a dubbing destination, said first storage medium including a program area and a management area, said program area having a plurality of programs recorded therein, said management area retaining management information for managing the programs stored in said program area, said dubbing apparatus comprising:

comparing means for comparing a total amount of data constituting programs to be dubbed at the higher speed among said plurality of programs recorded on the dubbing source first storage medium, with a recordable capacity of the dubbing destination second storage medium;

recording controlling means which, if said comparing means judges that the total amount of the data constituting the programs to be dubbed from said dubbing source first storage medium is greater than the recordable capacity of said dubbing destination second storage medium, then dubs at said higher speed at least the programs that are recordable each in its entirety onto said dubbing destination second storage medium within the recordable capacity thereof; and storing means for storing a disable flag and an enable flag, said disable flag inhibiting for a predetermined period of time a new session of dubbing at said higher speed of each of the programs that have been recorded each in its entirety at said higher speed onto said dubbing destination second storage medium, said enable flag allowing a program not accommodated in its entirety by said dubbing destination second storage medium to be dubbed consecutively at said higher speed.

2. A dubbing apparatus according to claim 1, further comprising time counting means for counting time, wherein, if the time counted by said time counting means falls within said predetermined period of time, then said recording controlling means, on the basis of the disable flags held in said storing means, inhibits dubbing at said higher speed of the programs that have been recorded each in its entirety at said higher speed onto said dubbing destination second storage medium.

3. A dubbing apparatus according to claim 1, further comprising:

time counting means for counting time; and controlling means which, if the time counted by said time counting means has reached said predetermined period of time, then resets said disable flag inhibiting for said predetermined period of time a new session of dubbing at said higher speed of each of the programs that have been recorded each in its entirety at said higher speed onto said dubbing destination second storage medium.

4. A dubbing apparatus according to claim 1, wherein said recording controlling means permits standard-speed dubbing of the programs inhibited from being dubbed at said higher speed by the disable flags set in said storing means.

5. A dubbing apparatus according to claim 1, wherein said management area stores identifiers for identifying said plurality of programs recorded in said program area of said dubbing source first storage medium, and wherein each of the identifiers reproduced from said management area is stored into said storing means in correspondence with said disable flag and said enable flag.

6. A dubbing apparatus according to claim 5, further comprising:

second comparing means for comparing identifiers which are stored in said storing means and which identify said plurality of programs recorded in said program area of said dubbing source first storage medium, with identifiers identifying the programs which are designated for higher-speed dubbing and which are stored in said program area of said dubbing source first storage medium; and controlling means which, if said second comparing means judges that any of the identifiers which are stored in said storing means and which identify said plurality of programs recorded in said program area of said dubbing source first storage medium coincides with any of the identifiers identifying the programs which are designated for higher-speed dubbing and which are stored in said program area of said dubbing source first storage medium, then either enables or disables higher-speed dubbing of the identified program in accordance with either the enable flag or the disable flag set in correspondence with the matched identifier.

7. A dubbing method for dubbing, at a predetermined speed higher than a standard dubbing speed, programs reproduced from a first storage medium serving as a dubbing source onto a second storage medium acting as a dubbing destination, said first storage medium including a program area and a management area, said program area having a plurality of programs recorded therein, said management area retaining management information for managing the programs stored in said program area, said dubbing method comprising the steps of:

comparing a total amount of data constituting programs to be dubbed at the higher speed among said plurality of programs recorded on the dubbing source first storage medium, with a recordable capacity of the dubbing destination second storage medium;

if the total amount of the data constituting the programs to be dubbed from said dubbing source first storage medium is judged to be greater than the recordable capacity of said dubbing destination second storage medium, then dubbing at said higher speed at least the programs that are recordable each in its entirety onto said dubbing destination second storage medium within the recordable capacity thereof; and storing a disable flag and an enable flag, said disable flag inhibiting for a predetermined period of time a new session of dubbing at said higher speed of each of the programs that have been recorded each in its entirety at said higher speed onto said dubbing destination second storage medium, said enable flag allowing a program not accommodated in its entirety by said dubbing destination second storage medium to be dubbed consecutively at said higher speed.

8. A dubbing method according to claim 7, further comprising the steps of:

counting time; and if the counted time falls within said predetermined period of time, then on the basis of the disable flags stored in said storing step, inhibiting dubbing at said higher speed of the programs that have been recorded each in its entirety at said higher speed onto said dubbing destination second storage medium.

9. A dubbing method according to claim 7, further comprising the step of:

counting time; and if the counted time has reached said predetermined period of time, then resetting said disable flag inhibiting for said predetermined period of time a new session of dubbing at said higher speed of each of the programs that have been recorded each in its entirety at said higher speed onto said dubbing destination second storage medium.

10. A dubbing method according to claim 7, further comprising the step of permitting standard-speed dubbing of the programs inhibited from being dubbed at said higher speed by the disable flags set in said storing step.

11. A dubbing method according to claim 7, wherein said management-area stores identifiers for identifying said plurality of programs recorded in said program area of said dubbing source first storage medium, and wherein each of the identifiers reproduced from said management area is stored in said storing step in correspondence with said disable flag and said enable flag.

12. A dubbing method according to claim 11, further comprising the steps of:

comparing identifiers which are stored in said storing step and which identify said plurality of programs recorded in said program area of said dubbing source first storage medium, with identifiers identifying the programs which are designated for higher-speed dubbing and which are stored in said program area of said dubbing source first storage medium; and if any of the identifiers which are stored in said storing step and which identify said plurality of programs recorded in said program area of said dubbing source first storage medium is judged to coincide with any of the identifiers identifying the programs which are designated for higher-speed dubbing and which are stored in said program area of said dubbing source first storage medium, then either enabling or disabling higher-speed dubbing of the identified program in accordance with either the enable flag or the disable flag set in correspondence with the matched identifier.

* * * * *

UNITED STATES PATENT AND TRADEMARK OFFICE
CERTIFICATE OF CORRECTION

PATENT NO. : 6,603,718 B1
DATED : August 5, 2003
INVENTOR(S) : Hiroyuki Ozawa

It is certified that error appears in the above-identified patent and that said Letters Patent is hereby corrected as shown below:

Column 6,
Line 40, change "20B a" to -- 20B is a --;
Line 50, change "readonly" to -- read-only --.

Column 10,
Line 32, change ""100000L."" to -- "1000000L." --.

Column 24,
Line 44, change "another," to -- another --.

Column 30,
Line 52, change "entirely" to -- entirety --;
Line 56, change "CD are," to -- CD are --;
Line 65, change "Sill," to -- S111, --.

Column 31,
Line 62, change "dubbing," to -- dubbing --.

Column 36,
Line 50, change "mangement-area" to -- management area --.

Signed and Sealed this

Third Day of August, 2004

JON W. DUDAS
*Acting Director of the United States Patent and Trademark Office*